United States Patent
Ono

(10) Patent No.: US 9,834,107 B2
(45) Date of Patent: Dec. 5, 2017

(54) EXTERNAL POWER SUPPLY CONNECTOR, VEHICLE, AND EXTERNAL POWER SUPPLY SYSTEM

(75) Inventor: Tomoya Ono, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 482 days.

(21) Appl. No.: 14/418,053

(22) PCT Filed: Aug. 1, 2012

(86) PCT No.: PCT/JP2012/069547
§ 371 (c)(1),
(2), (4) Date: Jan. 28, 2015

(87) PCT Pub. No.: WO2014/020715
PCT Pub. Date: Feb. 6, 2014

(65) Prior Publication Data
US 2015/0258906 A1 Sep. 17, 2015

(51) Int. Cl.
*B60L 11/18* (2006.01)
*B60L 11/14* (2006.01)
(Continued)

(52) U.S. Cl.
CPC ............. *B60L 11/1842* (2013.01); *B60L 7/14* (2013.01); *B60L 11/005* (2013.01);
(Continued)

(58) Field of Classification Search
CPC .. B60L 11/1842; B60L 11/005; B60L 11/123; B60L 11/14; B60L 11/1818; B60L 11/1846; B60L 11/1861; B60L 11/1877; B60L 11/2009; B60L 7/14; B60L 2210/10; B60L 2210/30; B60L 2210/40;
(Continued)

(56) References Cited

U.S. PATENT DOCUMENTS

| | | |
|---|---|---|
| 2004/0057450 A1 | 3/2004 | Okuyama |
| 2009/0102433 A1 | 4/2009 | Kamaga |
| 2011/0121779 A1 | 5/2011 | Ichikawa et al. |

FOREIGN PATENT DOCUMENTS

| | | |
|---|---|---|
| JP | H09-326818 A | 12/1997 |
| JP | H11-501196 A | 1/1999 |

(Continued)

*Primary Examiner* — Hal Kaplan
(74) *Attorney, Agent, or Firm* — Oliff PLC

(57) ABSTRACT

An external power supply connector attached to a vehicle-side connecting portion and control unit controlling the supply power to the vehicle-side connecting portion, supplying power from the vehicle to outside. The external power supply connector includes a body including an external connecting portion to an electric plug supplying power to a connected external device; a restricting member enables switching between restricting state wherein the electric plug is restricted from being attached and detached to and from the external connecting portion, and allowing state enabling the electric plug to attach and detach to and from the external connecting portion. A signal outputting portion outputs a signal to the control unit and detecting portion. The detecting portion detects the restricting state and allowing state of the restricting member. In allowing state, the signal outputting portion outputs a prohibiting signal from being supplied to the external power supply connector to the control unit.

11 Claims, 25 Drawing Sheets

(51) Int. Cl.
*H01R 13/447* (2006.01)
*H01R 13/70* (2006.01)
*B60L 7/14* (2006.01)
*B60L 11/00* (2006.01)
*B60L 11/12* (2006.01)
*B60L 15/20* (2006.01)
*B60K 1/04* (2006.01)
*B60K 15/063* (2006.01)

(52) U.S. Cl.
CPC .............. *B60L 11/123* (2013.01); *B60L 11/14* (2013.01); *B60L 11/1818* (2013.01); *B60L 11/1846* (2013.01); *B60L 11/1861* (2013.01); *B60L 11/1877* (2013.01); *B60L 15/2009* (2013.01); *H01R 13/447* (2013.01); *H01R 13/701* (2013.01); *B60K 2001/0416* (2013.01); *B60K 2015/0638* (2013.01); *B60L 2210/10* (2013.01); *B60L 2210/30* (2013.01); *B60L 2210/40* (2013.01); *B60L 2220/14* (2013.01); *B60L 2240/12* (2013.01); *B60L 2240/421* (2013.01); *B60L 2240/423* (2013.01); *B60L 2240/441* (2013.01); *B60L 2240/443* (2013.01); *B60L 2240/80* (2013.01); *B60L 2270/20* (2013.01); *B60L 2270/32* (2013.01); *B60L 2270/34* (2013.01); *H01R 2201/26* (2013.01); *Y02T 10/6217* (2013.01); *Y02T 10/645* (2013.01); *Y02T 10/7005* (2013.01); *Y02T 10/705* (2013.01); *Y02T 10/7022* (2013.01); *Y02T 10/7044* (2013.01); *Y02T 10/7072* (2013.01); *Y02T 10/7077* (2013.01); *Y02T 10/7216* (2013.01); *Y02T 10/7241* (2013.01); *Y02T 10/7275* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
CPC ............ B60L 2220/14; B60L 2240/12; B60L 2240/421; B60L 2240/423; B60L 2240/441; B60L 2240/443; B60L 2240/80; B60L 2270/20; B60L 2270/32; B60L 2270/34; H01R 13/447; H01R 13/701; H01R 2201/26; B60K 2001/0416; B60K 2015/0638; Y02T 10/6217; Y02T 10/645; Y02T 10/7007; Y02T 10/7022; Y02T 10/7044; Y02T 10/705; Y02T 10/7072; Y02T 10/7077; Y02T 10/7216; Y02T 10/7241; Y02T 10/7275; Y02T 90/121; Y02T 90/127; Y02T 90/128; Y02T 90/14; Y02T 90/163; Y02T 90/169; Y04S 30/14
USPC .................................................. 307/9.1, 10.1
See application file for complete search history.

(56) References Cited

FOREIGN PATENT DOCUMENTS

| | | |
|---|---|---|
| JP | 2004-048304 A | 2/2004 |
| JP | 2006-020455 A | 1/2006 |
| JP | 2008-072328 A | 3/2008 |
| JP | 2009-106053 A | 5/2009 |
| JP | 2010-035277 A | 2/2010 |
| JP | 5099281 B1 | 12/2012 |
| WO | 97/23976 A1 | 7/1997 |

EXTERNAL POWER SUPPLY CONNECTOR, VEHICLE, AND EXTERNAL POWER SUPPLY SYSTEM

TECHNICAL FIELD

The invention typically relates to an external power supply connector, a vehicle, and an external power supply system.

BACKGROUND ART

In recent years, vehicles equipped with a power storage device (e.g., a secondary battery or a capacitor or the like) that run using driving force generated from power stored in the power storage device are receiving a lot of attention as environmentally friendly vehicles. Some examples of such vehicles include electric vehicles, hybrid vehicles, and fuel cell vehicles and the like. Also, technology for charging the power storage device on board these vehicles using a commercial power supply with high power generating efficiency has been proposed.

Among hybrid vehicles as well, a vehicle in which an onboard power storage device is able to be charged from a power supply outside the vehicle (hereinafter, also simply referred to as an "external power supply") (hereinafter, also simply referred to as "external charging"), similar to an electric vehicle, is known. For example, a so-called "plug-in hybrid vehicle" in which the power storage device is able to be charged from a typical household power supply by connecting an outlet provided in a house to a charging port provided in the vehicle, is known. Consequently, an increase in fuel consumption efficiency of the hybrid vehicle is able to be expected.

In a vehicle in which such external charging is possible, the concept of thinking of the vehicle as a power supply and supplying power from the vehicle to a typical electrical device outside the vehicle, as can be seen in a smart grid and the like, is being considered. Also, there is also a case in which a vehicle is used as a power supply when using an electrical device for outdoor work or when camping.

Japanese Patent Application Publication No. 2010-35277 (Patent Document 1) describes a charging/discharging system that, in a vehicle in which a battery mounted in the vehicle is able to be charged using a charging cable, is able to supply power from the vehicle to an electrical load using a dedicated power-supplying power cable that differs from the charging cable and that can be connected to a power plug of an electrical load outside the vehicle.

PRIOR ART DOCUMENTS

Patent Documents

Patent Document 1: Japanese Patent Application Publication No. 2010-35277
Patent Document 2: Japanese Patent Application Publication No. 2009-106053
Patent Document 3: Japanese Patent Application Publication No. 2006-020455

SUMMARY OF THE INVENTION

Problems to be Solved by the Invention

However, when attempting to connect an electric plug of an external device such as a rice cooker or a fan to the dedicated power-supplying power cable described in Japanese Patent Application Publication No. 2010-35277, there may be cases in which voltage from the battery is already being applied to a terminal portion of the power cable. Also, there may be cases in which, while the electric plug is connected to the terminal portion of the power cable and voltage is being applied to the terminal portion of the power cable, the electric plug becomes unplugged from the electric cable. There may be negative effects such as deterioration of the electric plug if the electric plug is unplugged while voltage is being applied to the terminal portion of the power cable in this way.

In view of this kind of problem, the object of the invention relates to an external power supply connector, a vehicle, and an external power supply system that is able to suppress deterioration of the electric plug at times such as when the electric plug is connected.

Means for Solving the Problems

The external power supply connector according to the invention is an external power supply connector that is attached to a vehicle-side connecting portion of a vehicle that includes the vehicle-side connecting portion and a control unit that controls an operation to supply power to the vehicle-side connecting portion, and that supplies power from the vehicle to outside the vehicle. The external power supply connector is provided with a device main body that includes an external connecting portion to which an electric plug that supplies the power to an external device is connected; a restricting member that is able to switch between a restricting state in which the electric plug is restricted from being attached and detached to and from the external connecting portion, and an allowing state that enables the electric plug to be attached and detached to and from the external connecting portion; a signal outputting portion that outputs a signal to the control unit; and a detecting portion.

The detecting portion detects the restricting state and the allowing state of the restricting member. The signal outputting portion outputs a signal prohibiting power from being supplied to the external power supply connector to the control unit when in the allowing state.

Preferably, the restricting member is a cover that is movably provided on the device main body. The cover is provided movable in an open direction from a closed state covering the external connecting portion to an open state in which the external connecting portion is open to the outside, and is provided movable in a closed direction so as to be placed in the closed state from the open state. The restricting state is a state in which the cover is in the closed state, and the allowing state is a state in which the cover is in the open state.

Preferably, the signal outputting portion outputs a signal to supply power to the external power supply connector to the control unit when the external power supply connector is connected to the vehicle-side connecting portion, and there is a change from the allowing state to the restricting state.

Preferably, a device-side connecting portion that is provided on the device main body and fits together with the vehicle-side connecting portion, a device-side engaging portion that engages with a vehicle-side engaging portion provided on the vehicle, and a switching portion that is operated by a user, and switches between an engaged state in which the device-side engaging portion engages with the vehicle-side engaging portion, and a released state in which the engaged state is released, are also provided. The external power supply connector is connected to the vehicle-side connecting portion by the device-side connecting portion fitting together with the vehicle-side connecting portion, and the device-side engaging portion engaging with the vehicle-side engaging portion. The signal outputting portion outputs a signal prohibiting power from being supplied to the external power supply connector to the control unit, when the switching portion is operated so as to be placed in the released state while the external power supply connector is connected to the vehicle-side connecting portion.

Preferably, an operating portion that is operated by a user is also provided. The signal outputting portion outputs a signal to supply power to the external power supply connector to the control unit, when the operating portion is operated when the external power supply connector is connected to the vehicle-side connecting portion, and the restricting portion is in the restricting state.

The external power supply connector includes a device-side connecting portion that is provided on the device main body and is connected to the vehicle-side connecting portion; a device-side engaging portion that engages with a vehicle-side engaging portion provided on the vehicle; a switching portion that is operated by a user, and switches between an engaged state in which the device-side engaging portion engages with the vehicle-side engaging portion, and a released state in which the engaged state is released; and an operating portion that is operated by the user. The signal outputting portion outputs a first signal indicating that the restricting member is in the allowing state, a second signal indicating that the restricting member is in the restricting state, a third signal indicating that the switching portion has been operated such that the device-side engaging portion is placed in the engaged state, a fourth signal indicating that the switching portion has been operated such that the device-side engaging portion is placed in the released state, and a fifth signal indicating that the operating portion has been operated by the user.

A vehicle according to the invention is provided with a vehicle-side connecting portion to which an external power supply connector is connected, a battery, and a control unit that controls power supplied from the battery to the vehicle-side connecting portion. Preferably, the external power supply connector includes a device main body that includes an external connecting portion to which an electric plug that is connected to an external device is connected, and a restricting member that is able to switch between a restricting state in which the electric plug is restricted from being attached and detached to and from the external connecting portion, and an allowing state that enables the electric plug to be attached and detached to and from the external connecting portion. The control unit does not supply power to the external power supply connector when in the restricting state.

Preferably, the control unit supplies power to the external power supply connector when the restricting member changes from the allowing state to the restricting state, while the external power supply connector is connected to the vehicle-side connecting portion.

Preferably, the external power supply connector includes a device-side connecting portion that is provided on the device main body and fits together with the vehicle-side connecting portion, a device-side engaging portion that engages with a vehicle-side engaging portion provided on the vehicle, and a switching portion that is operated by a user, and switches between an engaged state in which the device-side engaging portion engages with the vehicle-side engaging portion, and a released state in which the engaged state is released. The external power supply connector is connected to the vehicle-side connecting portion by the device-side connecting portion fitting together with the vehicle-side connecting portion, and the device-side engaging portion engaging with the vehicle-side engaging portion.

The control unit does not supply power to the external power supply connector when the switching portion is operated so as to be placed in the released state, while the device-side connecting portion is connected to the vehicle-side connecting portion.

Preferably, the external power supply connector also includes an operating portion that is operated by a user. The control unit supplies power to the external power supply connector when the operating portion is operated when the external power supply connector is connected to the vehicle-side connecting portion, and the restricting member is in the restricting state.

An external power supply system according to the invention is an external power supply system that is provided with a vehicle that includes a control unit and a vehicle-side connecting portion, and an external power supply connector that is connected to the vehicle-side connecting portion and extracts power from the vehicle. The external power supply connector is provided with a device main body that includes an external connecting portion to which an electric plug that is connected to an external device is connected, and a restricting member that is provided on the device main body. The restricting member is able to switch between a restricting state in which the electric plug is restricted from being attached and detached to and from the external connecting portion, and an allowing state that enables the electric plug to be attached and detached to and from the external connecting portion. The control unit does not supply power to the external power supply connector when the restricting member is in the allowing state.

Effect of the Invention

With the external power supply connector, the vehicle, and the external power supply system according to the invention, deterioration of the electric plug at times such as when the electric plug is connected is able to be suppressed.

MODES FOR CARRYING OUT THE INVENTION

Figure 1:
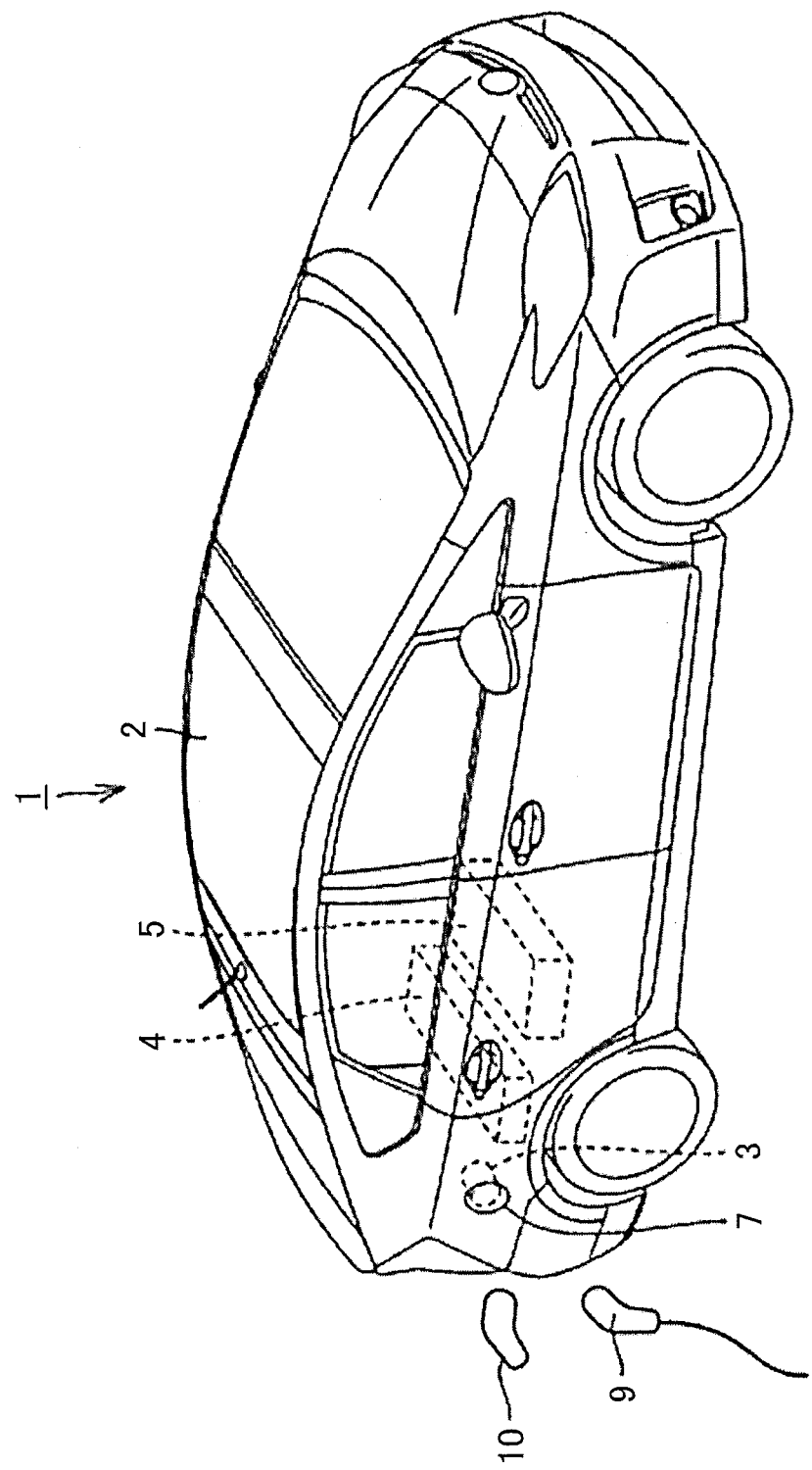
FIG. 1 is a perspective view showing a frame format of a vehicle 1 according to the example embodiment.

The external power supply supplying device, the vehicle, and the external power supply system according to the example embodiments will be described using FIG. 1 to FIG. 28. Like or substantially similar structures will be denoted by like reference numerals, and descriptions thereof may be omitted. Also, while a plurality of example embodiments are described below, combinations of the structures described in the example embodiments are intended from the beginning of application.

First Example Embodiment

FIG. 1 is a perspective view showing a frame format of a vehicle 1 according to the example embodiment. The vehicle 1 includes a body 2, a vehicle-side connecting portion 3 provided on a side surface of the body 2, a battery 4 housed inside the body 2, and a fuel tank 5.

The vehicle-side connecting portion 3 is housed inside a hole portion (a recessed portion) formed in the body 2, and a cover 7 that opens and closes an opening of the hole portion.

A charging connector 9 or an external power supply connector 10 or the like is able to be connected to the vehicle-side connecting portion 3 by the cover 7 being opened.

The charging connector 9 is a connector that is used to supply power from an external power supply to the battery 4, and charge the battery 4.

The external power supply connector 10 is a connector to extract power stored in the battery 4 to the outside.

Figure 2:
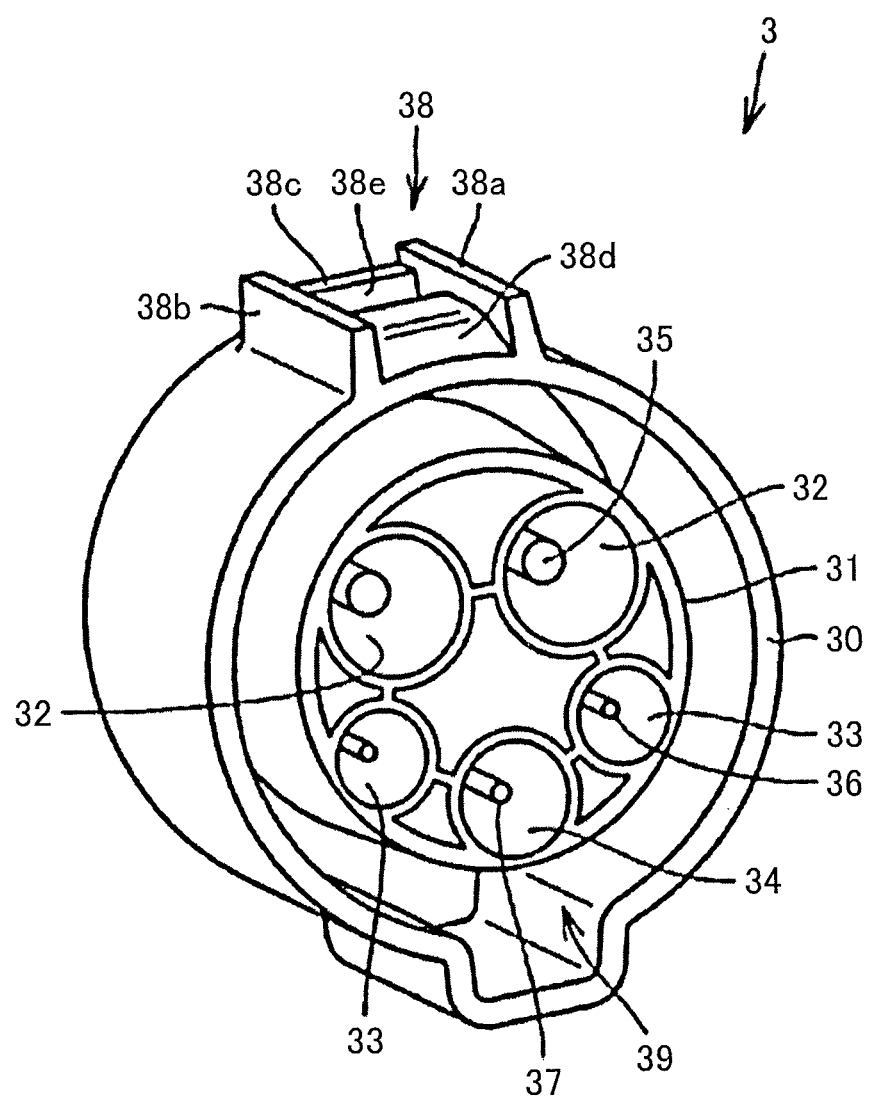
FIG. 2 is a perspective view showing a frame format of a vehicle-side connecting portion 3.
Figure 3:
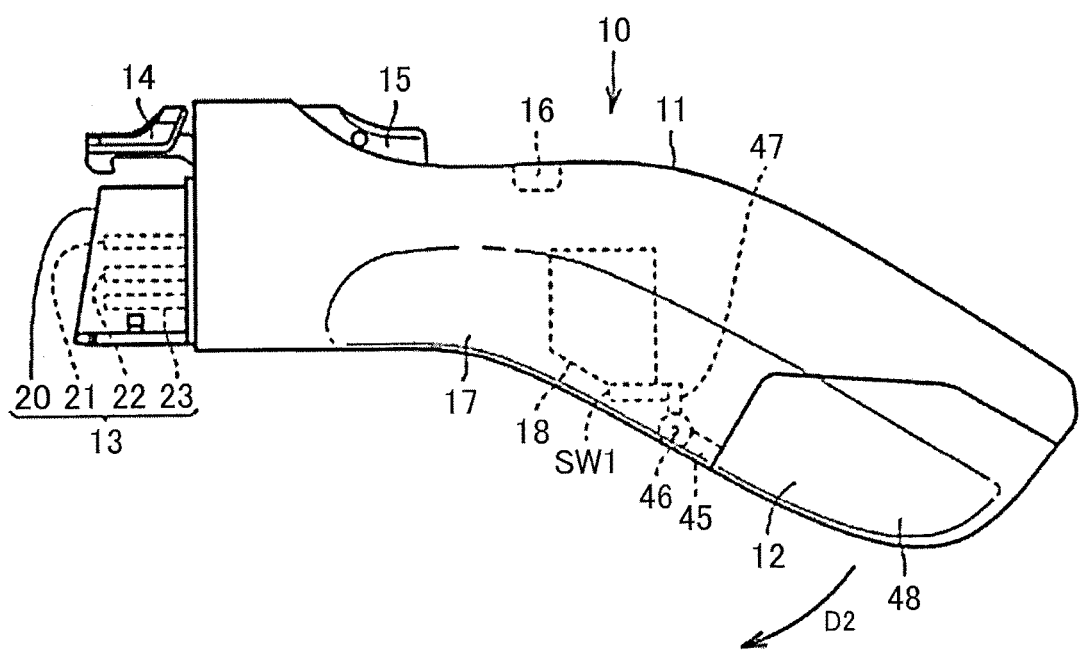
FIG. 3 is a side view of an external power supply connector 10.

FIG. 2 is a perspective view showing a frame format of the vehicle-side connecting portion 3. As shown in FIG. 3, the vehicle-side connecting portion 3 includes an outer cylindrical portion 30, an inner cylindrical portion 31 arranged inside the outer cylindrical portion 30, a plurality of cylindrical portions 32, 33, 34 arranged inside the inner cylindrical portion 31, a power terminal portion 35 housed inside the cylindrical portion 32, a signal terminal portion 36 housed inside the cylinder portion 33, and a ground terminal portion 37 housed inside the cylinder portion 34.

An engaging portion 38 is formed on the outer cylindrical portion 30. The engaging portion 38 includes a side wall 38a and a side wall 38b arranged apart in a circumferential direction of the outer cylindrical portion 30, and a back wall 38c, and a front wall portion 38d. An engaging hole 38e is formed by these walls. An annular groove 39 is formed between the outer cylindrical portion 30 and the inner cylindrical portion 31.

FIG. 3 is a side view of the external power supply connector 10. As shown in FIG. 3, the external power supply connector 10 includes a device main body 11, and a cover 12 provided on a rear end portion that is provided on the device main body 11.

The device main body 11 includes a long body portion 17, a device-side connecting portion 13 that is provided on a tip end portion of this body portion 17 and is connected to the vehicle-side connecting portion 3, an engaging portion 14 that is provided on the tip end portion of the body portion 17, a switching portion 15 and a power switch 16 that are provided on an upper surface of the body portion 17, a signal outputting portion 18 provided inside the body portion 17, and a switch SW1 that is provided inside the signal outputting portion 18. The body portion 17 has a length that is long enough to be held by a user.

Figure 4:
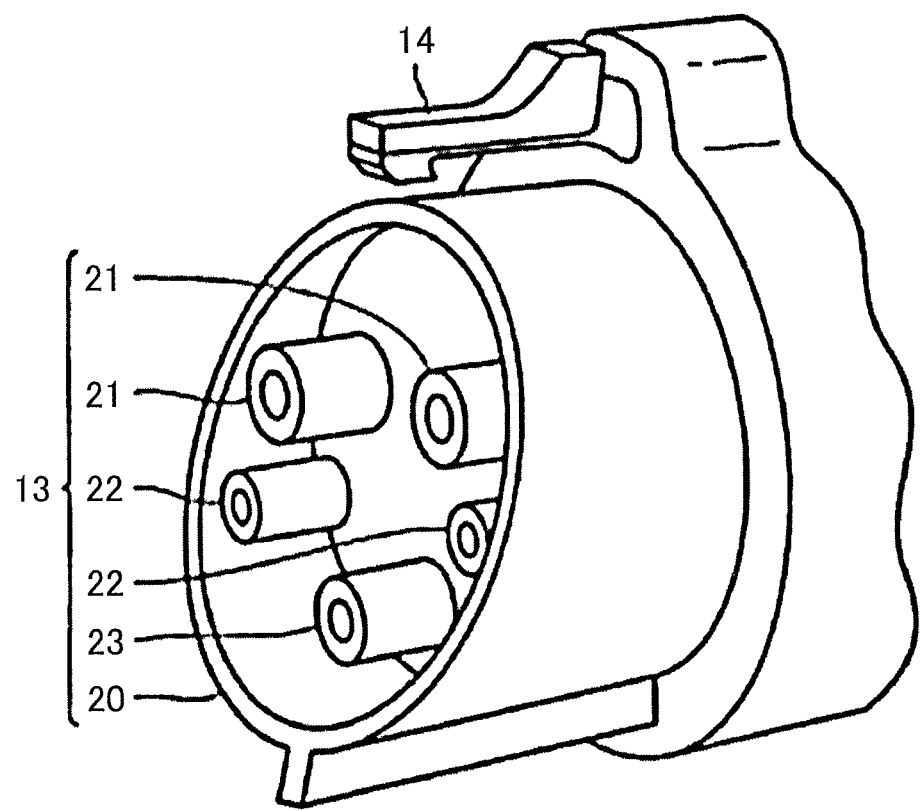
FIG. 4 is a perspective view of a device-side connecting portion 13.

FIG. 4 is a perspective view of the device-side connecting portion 13. The device-side connecting portion 13 includes a hollow cylindrical portion 20 that is formed protruding from the tip end portion of the body portion 17, and a power terminal portion 21, a signal terminal portion 22, and a ground terminal portion 23 that are housed inside the cylindrical portion 20.

The cylindrical portion 20 is formed fit into the groove 39 shown in FIG. 2. The power terminal portion 21, the signal terminal portion 22, and the ground terminal portion 23 are formed in cylindrical shapes. When the cylindrical portion 20 is fit into the groove 39, the power terminal portion 21 enters the cylindrical portion 32, and the power terminal portion 35 enters the power terminal portion 21. Similarly, the signal terminal portion 22 enters the cylinder portion 33, and the signal terminal portion 36 enters the signal terminal portion 22. The ground terminal portion 23 enters the cylinder portion 34, and the ground terminal portion 37 enters the ground terminal portion 23.

Here, when the device-side connecting portion 13 is fit into the vehicle-side connecting portion 3, it means that the cylindrical portion 20 has entered the groove 39, the power terminal portion 21 has entered the cylindrical portion 32, the signal terminal portion 22 has entered the cylinder portion 33, the ground terminal portion 23 has entered the cylinder portion 34, the power terminal portion 35 has entered the power terminal portion 21, the signal terminal portion 36 has entered the signal terminal portion 22, and the ground terminal portion 37 has entered the ground terminal portion 23, as described above.

In FIG. 3, the engaging portion 14 is provided movable in the vertical direction, and a catch that engages with the engaging portion 38 of the vehicle-side connecting portion 3 is formed on a tip end portion of the engaging portion 14.

The switching portion 15 is operated by a user, and is able to be switched between a state in which the engaging portion 14 and the vehicle-side connecting portion 3 are engaged, and a state in which engaged state of the engaging portion 14 and the vehicle-side connecting portion 3 is released, by the user operating the switching portion 15.

The state in which the engaging portion 14 and the vehicle-side connecting portion 3 are engaged is a state in which the catch of the engaging portion 14 has entered into the engaging hole 38e of the engaging portion 38 shown in FIG. 2. The state in which the engaged state of the engaging portion 14 and the vehicle-side connecting portion 3 is released is a state in which the catch of the engaging portion 14 has come out of the engaging hole 38e.

When the user pushes the switching portion 15, the tip end portion of the engaging portion 14 is consequently displaced upward and the connected state of the engaging portion 14 and the vehicle-side connecting portion 3 becomes a released state. When the user releases the switching portion 15, the engaging portion 14 becomes horizontal, and the engaging portion 14 and the vehicle-side connecting portion 3 become engaged. The power switch 16 is a switch that is pushed by the user. The power switch 16 is urged so as to return to a constant position by an elastic member that is not shown.

The power switch 16 is an operating portion that is operated by the user. The power switch 16 is one example of the operating portion. Another type of switch such as a slide switch may also be employed. A touch panel or the like may also be employed. The structure of the signal outputting portion 18 will be described later.

Figure 5:
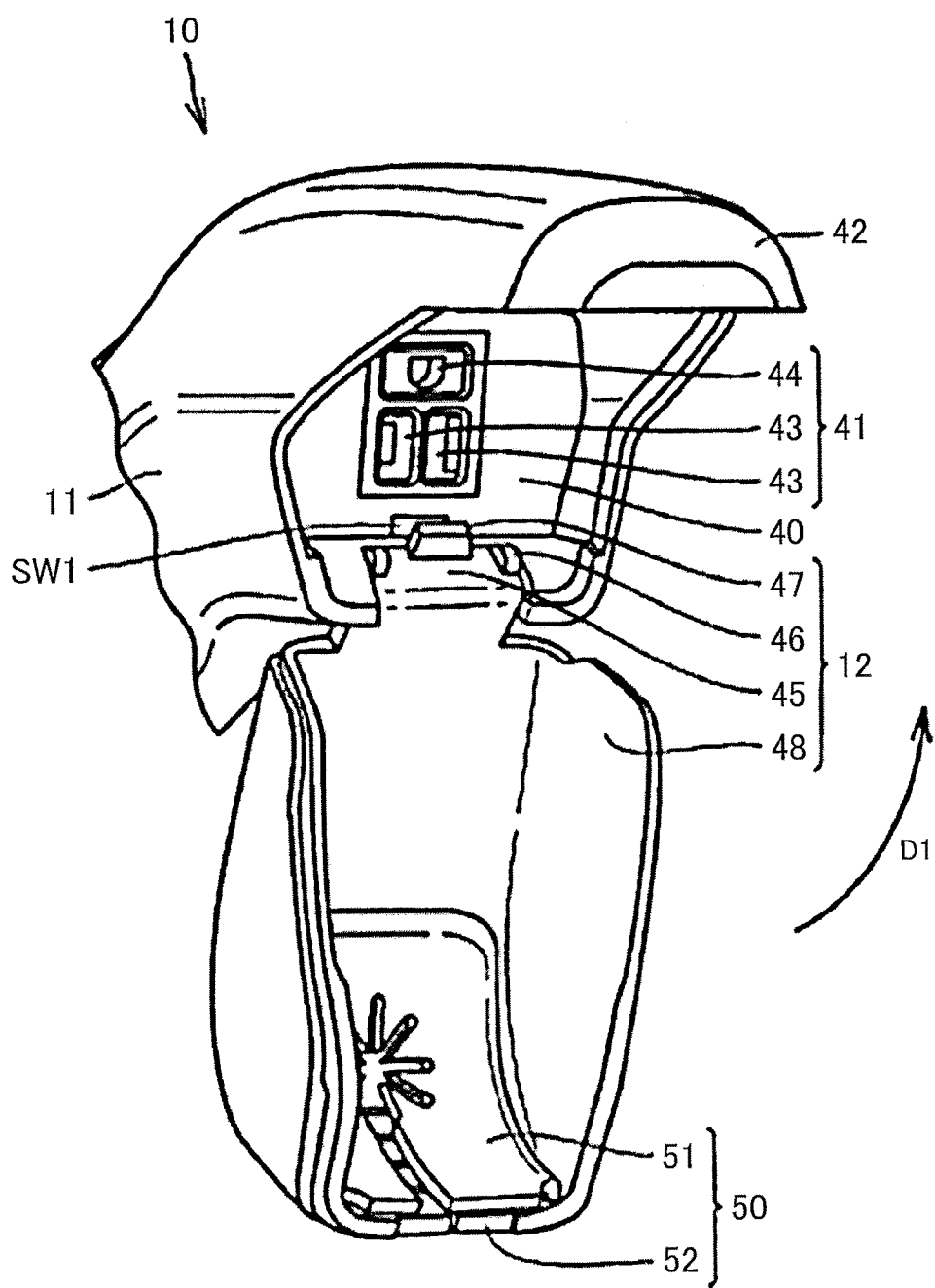
FIG. 5 is a perspective view of a rear end portion of the external power supply connector 10 when a cover 12 is open.

FIG. 5 is a perspective view of a rear end portion of the external power supply connector 10. As shown in FIG. 5, the device main body 11 includes a rear end wall 40 that has a flat shape, an external connecting portion 41 provided on this rear end wall 40, and an cave portion 42 formed on an upper edge portion of the rear end wall 40. The external connecting portion 41 is a connecting portion to which an electric plug of an external device or the like is connected. The switch SW1 is provided on the rear end wall 40.

The external connecting portion 41 includes power terminals 43, 43, and a ground terminal 44. The cover 12 includes a rotating shaft 45, a waterproof hinge portion 46 that rotatably supports end portions of the rotating shaft 45 on the device main body 11, a protruding portion 47 formed on the rotating shaft 45, a cover main body 48 integrally formed with the rotating shaft 45, and a seal member 50 that is provided on an inner peripheral surface of the cover main body 48 so as to close off a cord pull-out hole formed in the cover main body 48.

The seal member 50 includes an inner seal piece 51, and an outer seal piece 52 arranged to the outside of the inner seal piece 51. A radial slit is formed in the inner seal piece 51, and a plurality of slits are also formed in the outer seal piece 52.

Figure 6:
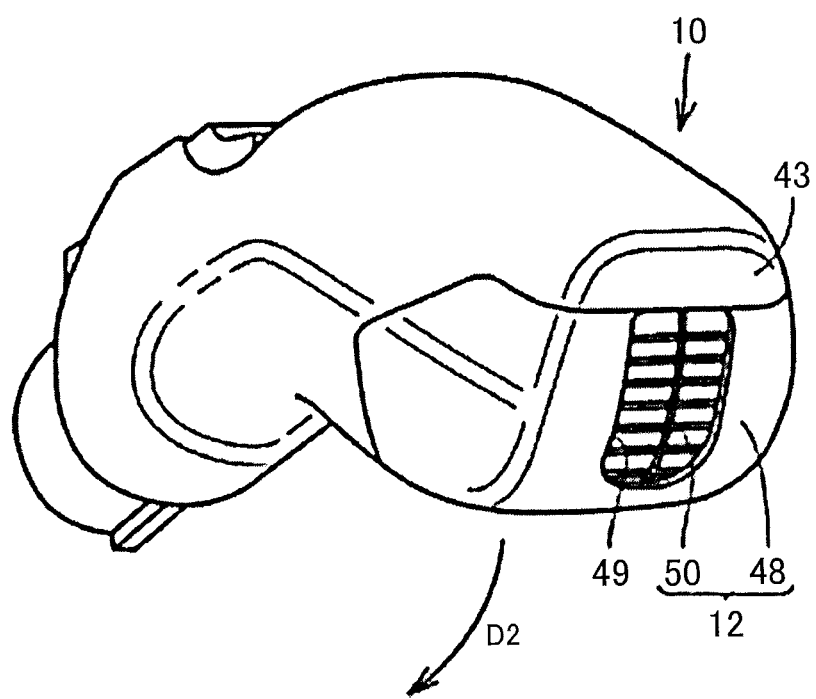
FIG. 6 is a perspective view of the rear end portion of the external power supply connector 10 when the cover 12 is closed.

The cover 12 is rotatably provided with respect to the device main body 11. More specifically, as shown in FIG. 5, the cover 12 is able to rotate (move) in a closed direction D1 from an open state in which the external connecting portion 41 is open to the outside. Then, the cover 12 is closed, covering the external connecting portion 41, as shown in FIG. 6. Similarly, the cover 12 is opened by rotating (moving) in an open direction D2 from the closed state.

Figure 7:
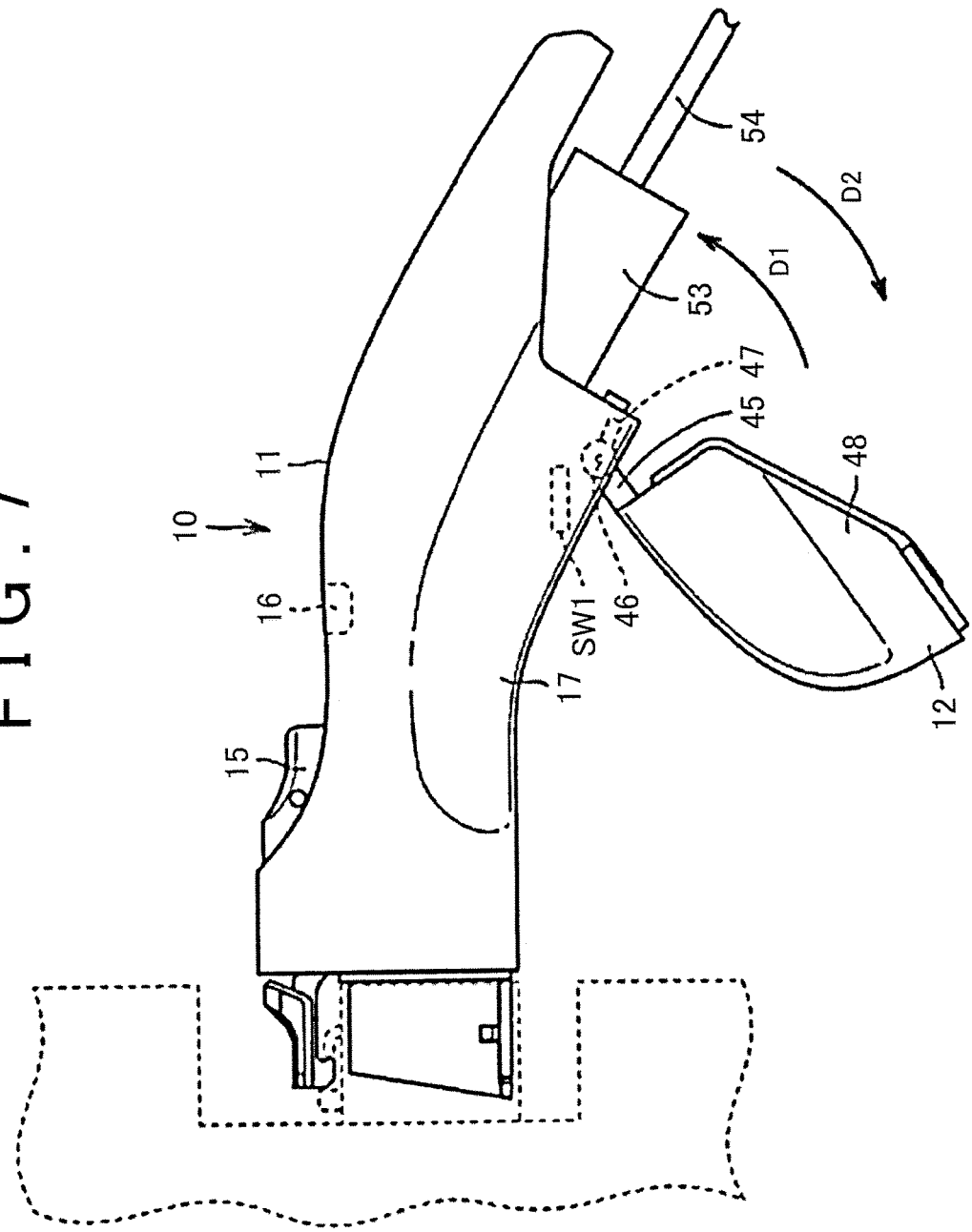
FIG. 7 is a side view of the external power supply connector 10 when the cover 12 is open.

FIG. 7 is a side view showing the external power supply connector 10 when the cover 12 is open. While the cover 12 is open, the user is able to connect an electric plug 53 to the external connecting portion 41, as shown in FIG. 7. While the cover 12 is open, the user is able to connect the electric plug 53 to the external connecting portion 41. Also, while the cover 12 is open, the user is able to unplug the electric plug 53 that is connected to the external connecting portion 41.

In this way, when the cover 12 is open, it is in an allowing state in which the electric plug 53 is able to be connected to the external connecting portion 41, and the electric plug 53 that is connected to the external connection portion 41 is able to be unplugged.

The electric plug 53 may be connected to a device such as a rice cooker or a fan, or may be connected to an extension cord, for example. In any case, the electric plug 53 supplies power to an external device outside the vehicle.

In FIG. 6, when the cover 12 is closed, the external connecting portion 41 and the rear end wall 40 are covered by the cover 12.

When the external connecting portion 41 is covered by the cover 12, the electric plug 53 is unable to be connected to the external connecting portion 41.

A slit is formed in the seal member 50 that covers a cord pull-out hole 49 in the cover main body 48, so when the cover 12 is closed while the electric plug 53 is connected, a cord 54 can be drawn out through the slit in the seal member 50.

On the other hand, the electric plug 53 is covered by the cover 12 and is unable to be touched from the outside, so the electric plug 53 is restricted from being pulled out. Even if the cord 54 is pulled from the outside, the electric plug 53 is retained by the cover 12, so the electric plug 53 is inhibited from becoming unplugged.

In this way, the state in which the cover 12 is closed is a restricting state in which the electric plug 53 is restricted from being connected to the electric plug 53, and the electric plug 53 that is connected to the external connecting portion 41 is restricted from being unplugged.

As shown in FIG. 3, when the cover 12 is closed, a protruding portion 47 pushes the switch SW1. When the cover 12 is rotated in the open direction D2 from a state in which the cover 12 is closed, the protruding portion 47 separates from the switch SW1.

Figure 8:
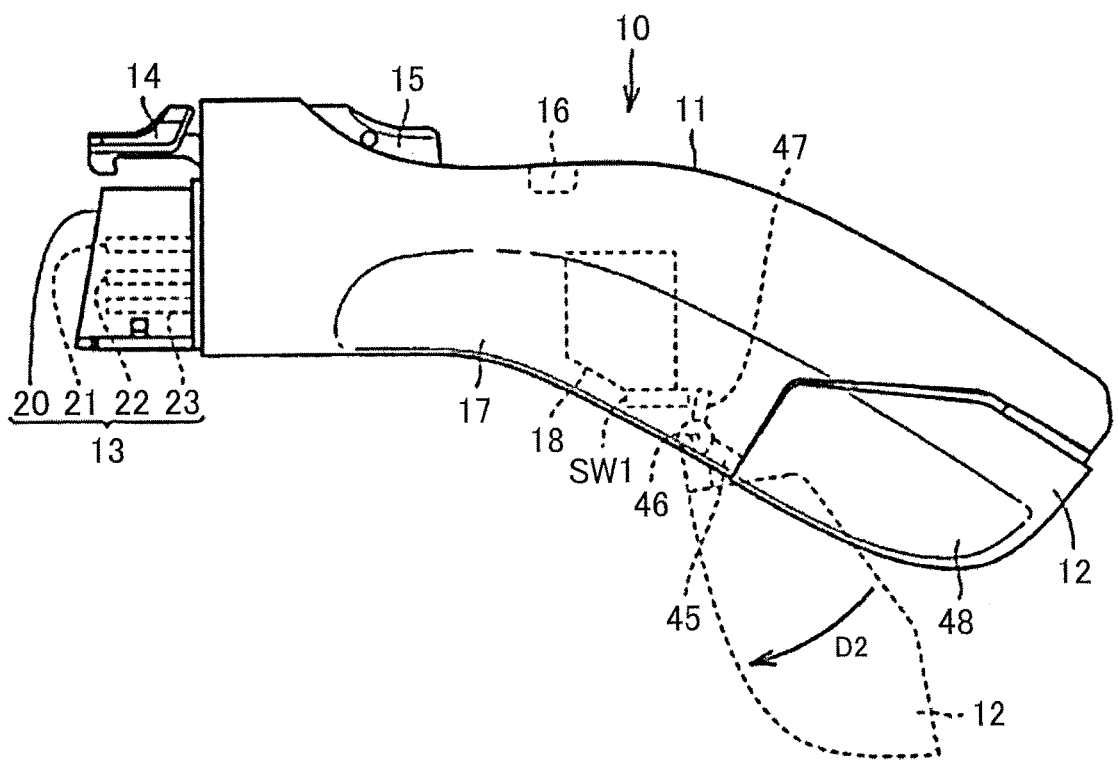
FIG. 8 is a side view of the external power supply connector 10 a state in which the cover 12 has been rotated in an open direction D2 from the closed state.

FIG. 8 is a side view of the external power supply connector 10 showing a state in which the cover 12 has been rotated in the open direction D2 from the closed state.

The state of the cover 12 shown in FIG. 8 is a state in which it has been rotated in the open direction D2 from the closed state. In the external power supply connector 10 according to this first example embodiment, when the cover 12 is rotated slightly in the open direction D2 from the closed state, the protruding portion 47 separates from the switch SW1.

The timing at which the protruding portion 47 separates from the switch SW1 is not limited to a case in which the cover 12 has moved slightly in the open direction D2 from the closed state as shown in FIG. 8.

For example, the protruding portion 47 may also separate from the switch SW1 when the cover 12 has rotated a predetermined angle, as with the cover 12 shown by the broken line in FIG. 8.

Also, the protruding portion 47 is separated from the switch SW1 when the cover 12 is open, as shown in FIG. 7.

Figure 9:
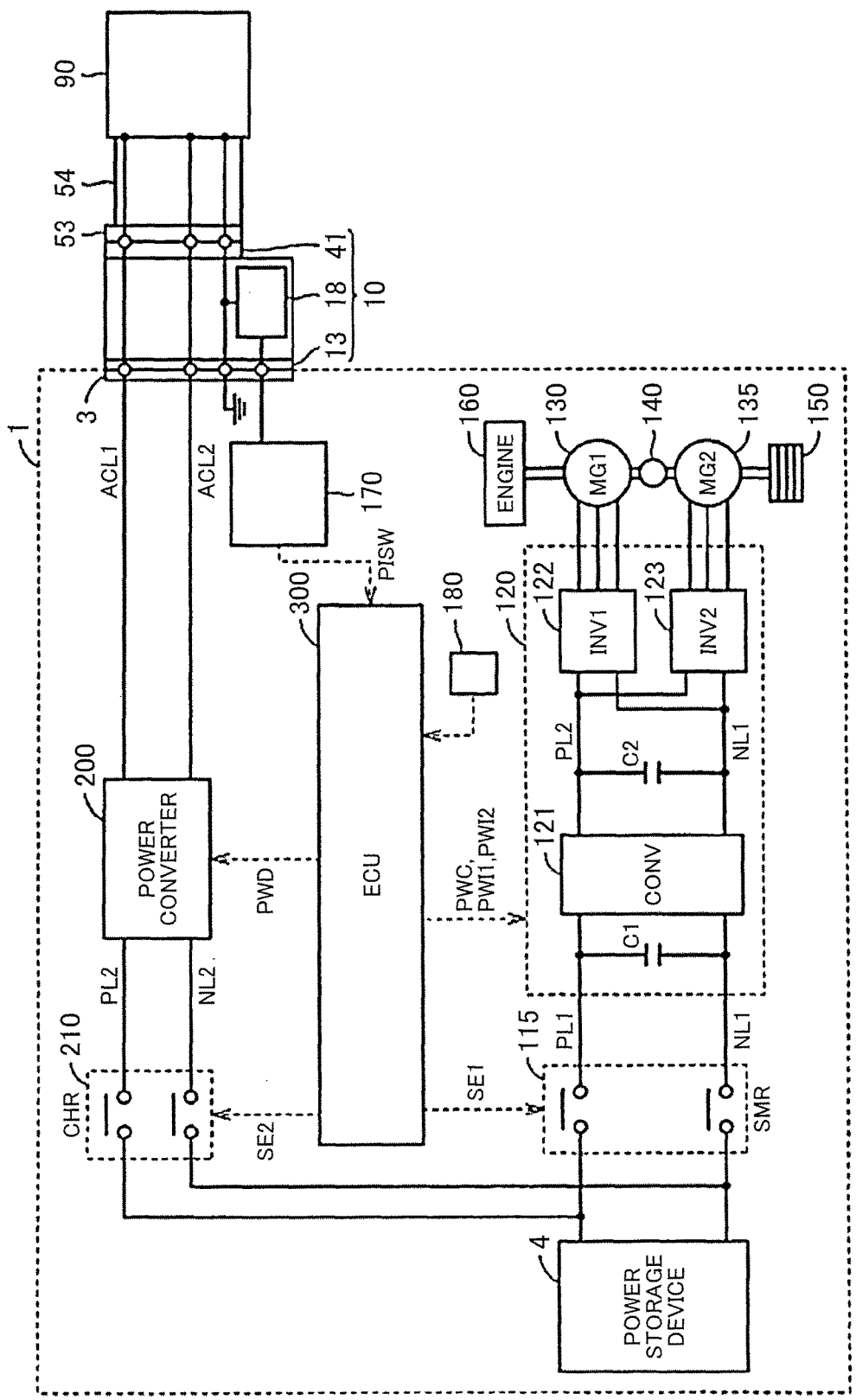
FIG. 9 is a block diagram of a state in which the external power supply connector 10 is connected to the vehicle 1.

FIG. 9 is a block diagram of a state in which the external power supply connector 10 is connected to the vehicle 1.

In FIG. 9, the vehicle 1 includes the battery 4, a system main relay (System Main Relay: SMR) 115, a PCU (Power Control Unit) 120 that is a drive unit, motor-generators 130, 135, a power transmitting gear 140, a driving wheel 150, an engine 160 that is an internal combustion engine, a vehicle power switch 180, and an ECU (Electronic Control Unit) 300 that is a control unit. The PCU 120 includes a converter 121, inverters 122, 123, and capacitors C1, C2.

The battery 4 is a power storage element configured to be able to charge and discharge power. The battery 4 includes a secondary battery such as a lithium-ion battery, a nickel-metal hydride battery, or a lead battery, or an electricity storage element such as an electric double layer capacitor.

The battery 4 is connected to the PCU 120 via a power line PL1 and a ground line NL1. Also, the battery 4 supplies power for generating driving force for the vehicle 1 to the PCU 120. Also, the battery 4 stores power generated by the motor-generators 130, 135. Output of the battery 4 is approximately 200 V, for example.

One relay included in the SMR 115 is connected to the power line PL1 that is connected to a positive terminal of the battery 4 and the PCU 120, and the other relay is connected to a negative terminal of the battery 4 and the ground line NL1. Also, the SMR 115 switches between supplying and cutting off power between the battery 4 and the PCU 120, based on a control signal SE1 from the ECU 300.

The converter 121 performs voltage conversion between the power line PL1 and the ground line NL1, and a power line PL2 and the ground line NL1, based on a control signal PWC from the ECU 300.

The inverters 122, 123 are connected in parallel to the power line PL2 and the ground line NL1. The inverters 122, 123 convert direct-current power supplied from the converter 121 to alternating-current power, and drive the motor-generators 130, 135, respectively, based on control signals PWI1, PWI2, respectively, from the ECU 300.

The capacitor C1 is provided between the power line PL1 and the ground line NL1 to reduce voltage fluctuation between the power line PL1 and the ground line NL1. Also, the capacitor C2 is provided between the power line PL2 and the ground line NL1 to reduce voltage fluctuation between the power line PL2 and the ground line NL1.

The motor-generators 130, 135 are alternating-current rotary electric machines, e.g., permanent-magnet synchronous motors provided with a rotor in which permanent magnets are embedded.

Output torque from the motor-generators 130, 135 is transmitted to the driving wheel 150 via the power transmitting gear 140 that includes a reduction gear and a power splitting mechanism, to run the vehicle 1. The motor-generators 130, 135 are able to generate power by the rotating force of the driving wheel 150 during regenerative braking operation of the vehicle 1. Also, this generated power is converted to charging power for the battery 4 by the PCU 120.

Also, the motor-generators 130, 135 are also connected to the engine 160 via the power transmitting gear 140. The motor-generators 130, 135 and the engine 160 are operated in a coordinated manner by the ECU 300 and the required vehicle driving force is generated. Moreover, the motor-generators 130, 135 are able to generate power by the rotation of the engine 160, and are able to charge the battery 4 using this generated power. In this example embodiment, the motor-generator 135 is used exclusively as an electric motor for driving the driving wheel 150, and the motor-generator 130 is used exclusively as a generator that is driven by the engine 160.

In FIG. 9, a configuration in which two motor-generators are provided is shown as an example, but the number of motor-generators is not limited to this. A configuration in which there is only one motor-generator, or in which more than two generators are provided, is also possible.

The vehicle 1 includes a vehicle-side connecting portion 3, power lines ACL1, ACL2 that are connected to the vehicle-side connecting portion 3, and a power converter 200 that is connected to the power lines ACL1, ACL2. The external power supply connector 10 is connected to the vehicle-side connecting portion 3, and the electric plug 53 is connected to the external power supply connector 10. A cord 54 is provided on the electric plug 53, and the cord 54 is connected to an external device 90.

The power converter 200 is connected to the battery 4 by the power line PL2 and the ground line NL2. The power converter 200 is controlled by a control signal PWD from the ECU 300. The power converter 200 converts direct-current current from the battery 4 to alternating-current current, and supplies it to the vehicle-side connecting portion 3.

A connection state detecting portion 170 generates a proximity detection signal PISW and outputs it to the ECU 300, in response to an output signal from the vehicle-side connecting portion 3.

The ECU 300 controls the power supplied from the battery 4 to the external power supply connector 10 according to the proximity detection signal PISW.

Figure 10:
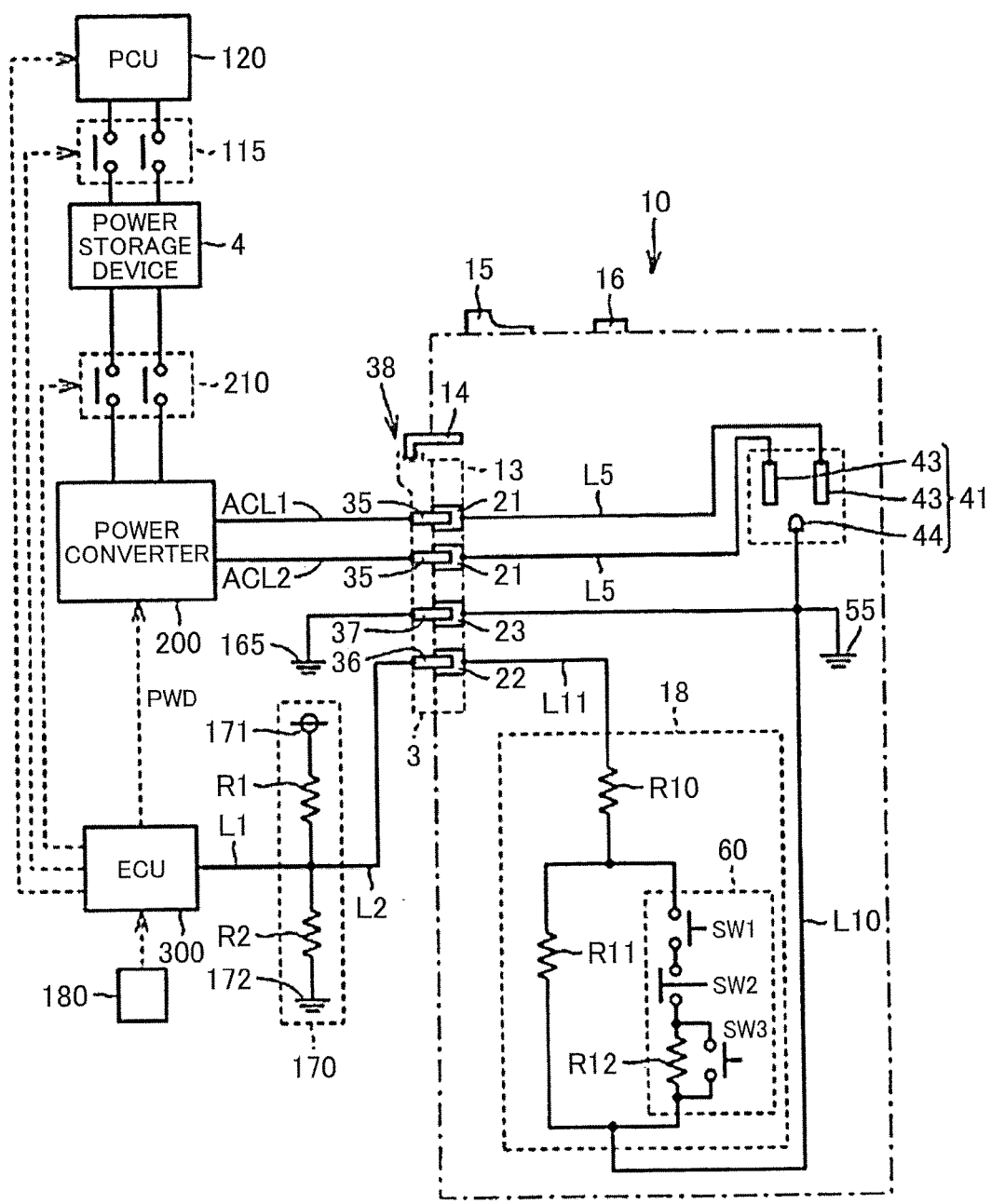
FIG. 10 is a block diagram illustrating an operation for generating a proximity detection signal PISW.

FIG. 10 is a block diagram illustrating an operation for generating the proximity detection signal PISW. In FIG. 10, the power terminal portions 35, 35 are connected to the power lines ACL1, ACL2. The ground terminal portion 37 is connected to a vehicle earth 165. The signal terminal portion 36 is connected to the connection state detecting portion 170.

The connection state detecting portion 170 includes a power supply node 171, a vehicle earth 172, a resistor R1 and a resistor R2 that are connected in series between the power supply node 171 and the vehicle earth 172, an output wire L1 that is connected to a connecting portion of the resistor R1 and the resistor R2 and also connected to the ECU 300, and a wire L2 that is connected between the resistor R1 and the resistor R2 and also connected to the signal terminal portion 36.

The output wire L1 outputs the proximity detection signal PISW to the ECU 300 in response to a signal from the signal outputting portion 18.

The external power supply connector 10 includes the signal outputting portion 18, the external connecting portion 41, a connector earth 55, power wire L5 that connect the power terminal portion 21 to the power terminals 43, a ground wire L10 that is connected to the connector earth 55, and an output wire L11 that is connected to the signal outputting portion 18. The output wire L11 connects the signal outputting portion 18 to the signal terminal portion 22. The ground wire L10 connects the ground terminal portion 23, the ground terminal 44, the connector earth 55, and the signal outputting portion 18.

The signal outputting portion 18 includes a resistor R10, a resistor R11, and a resistance converting portion 60.

The resistor R10 and the resistor R11 are connected in series between the ground wire L10 and the output wire L11. The resistance converting portion 60 is connected between the resistor R10 and the ground wire L10, and the resistance converting portion 60 is connected so as to be parallel to the resistor R11.

The resistance converting portion 60 includes a switch SW1, a switch SW2, a switch SW3, and a resistor R12.

The switch SW1, the switch SW2, and the resistor R12 are connected in series between the resistor R10 and the ground wire L10. The switch SW3 is connected so as to be parallel to the resistor R12.

The switch SW1 turns ON when being pushed by the protruding portion 47, as shown in FIG. 3, and turns OFF when not being pushed by the protruding portion 47, as shown in FIG. 7.

Therefore, the switch SW1 turns ON when the cover 12 is closed, and turns OFF when the cover 12 is open.

The switch SW2 turns ON when the switching portion 15 is not being pushed, and turns OFF when the switching portion 15 is being pushed. Therefore, the switch SW2 turns ON when the engaging portion 14 is in a position it which it is engaged with the engaging portion 38, and turns OFF when the engaging portion 14 is in a position in which the engaged state with the engaging portion 38 is released.

The switch SW3 turns ON when the power switch 16 is being pushed, and the switch SW3 turns OFF when the power switch 16 is not being pushed.

Figure 11:
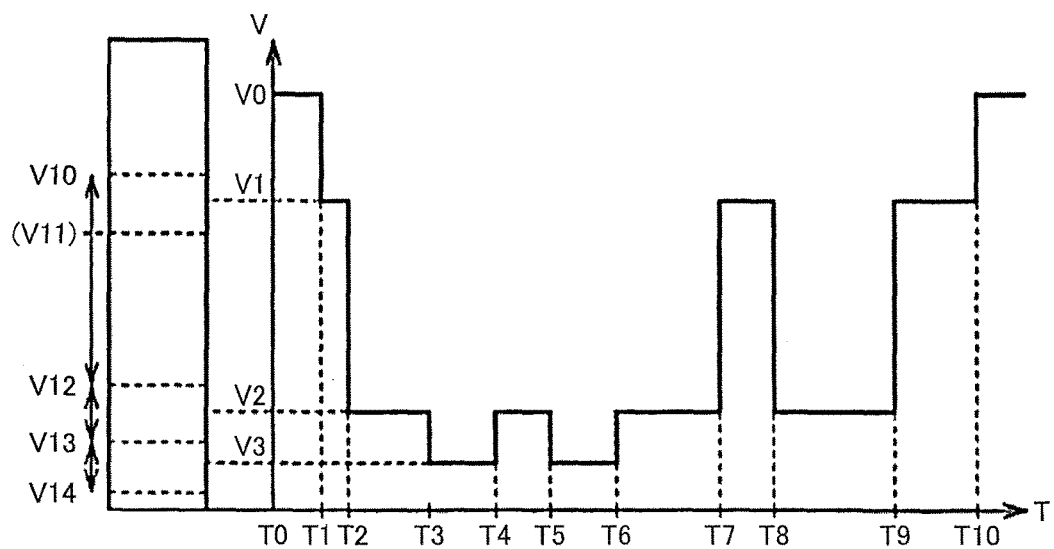
FIG. 11 is a graph showing potential fluctuation of an output wire L1 when a user connects the external power supply connector 10 to the vehicle-side connecting portion 3, or operates the external power supply connector 10.

FIG. 11 is a graph showing potential fluctuation of the output wire L1 when a user connects the external power supply connector 10 to the vehicle-side connecting portion 3, or operates the external power supply connector 10.

Figure 12:
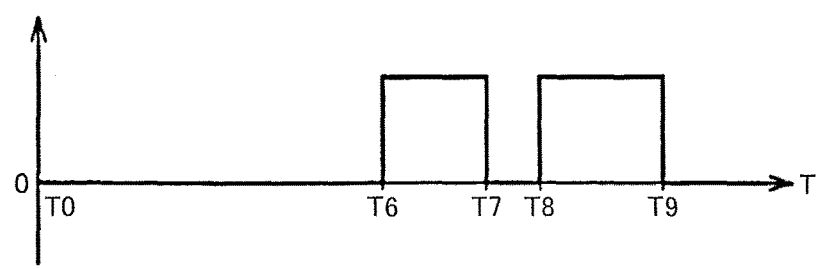
FIG. 12 is a graph illustrating the power supplied to an external connecting portion 41 when the operation shown in FIG. 11 is performed.

Each operation shown in FIG. 11 is an example of an example when it is performed by the user. More specifically, the user fits the external power supply connector 10 to which the electric plug 53 is connected, into the vehicle-side connecting portion 3 while the cover 12 is closed (time T1). At time T1, the state is the same as the state in which the engaging portion 14 is abutting against the front wall portion 38d, and the switching portion 15 is being pushed. Next, the state returns to the same state as the state in which the engaging portion 14 is engaged with the engaging portion 38, and the switching portion 15 is not being pushed, and the external power supply connector 10 is connected to the vehicle-side connecting portion 3 (time T2). Next, the user pushes the power switch 16 twice in a short period of time (time T3 to time T6). Next, the user opens the cover 12, unplugs the electric plug 53, plugs in another electric plug 53, and closes the cover 12 (time T7 to time T8). Next, the user pushes the switching portion 15 (time T9). Next, the user pulls the external power supply connector 10 out of the vehicle-side connecting portion 3 (time T10). The potential of the output wire L1 when this kind of operation is performed will now be described. In FIG. 11, the horizontal axis represents a time axis, and the vertical axis represents the potential of the output wire L1. FIG. 12 is a graph illustrating the power supplied to the external connecting portion 41 when the operation shown in FIG. 11 is performed.

In FIG. 11, at time T0, the external power supply connector 10 is neither connected to nor fit into the vehicle-side connecting portion 3.

At this time, in FIG. 11, a constant voltage of several V is applied to the power supply node 171, and the potential V of the output wire L1 becomes a potential V0.

Also, at time T1, the external power supply connector 10 is fit into the vehicle-side connecting portion 3. As a result, in FIG. 10, the signal terminal portion 36 enters the signal terminal portion 22, and the connection state detecting portion 170 and the signal outputting portion 18 are connected.

At this time, the cover 12 of the external power supply connector 10 is closed, the switch SW1 is ON, and the switching portion 15 is being pushed, so the switch SW1 is OFF. Therefore, the path in the resistance converting portion 60 is interrupted.

Therefore, in the signal outputting portion 18, the resistor R10 and the resistor R11 are connected in series between the ground wire L10 and the output wire L11.

By having this kind of signal outputting portion 18 connected to the connection state detecting portion 170, the potential of the output wire L1 drops, and the potential V becomes a potential V1 (potential V1<potential V0), as shown in FIG. 11.

Next, at time T2, the switch SW2 shown in FIG. 10 turns ON by the user releasing the switching portion 15. The path in the resistance converting portion 60 is placed in a conducting state. As a result, in the signal outputting portion 18, resistor R10 and the resistor R11 are connected in series, and the resistor R12 is connected so as to be parallel to the resistor R11, between the ground wire L10 and the output wire L1.

In this way, by fluctuating a resistance value of the signal outputting portion 18 so that it becomes smaller, the potential of the output wire L1 also drops, and the potential V becomes a potential V2 (potential V2<potential V1), as shown in FIG. 11.

Next, at time T3, the user pushes the power switch 16 shown in FIG. 10 once. As a result, the switch SW3 turns ON.

As a result of the switch SW3 turning ON, the resistor R10 and the resistor R11 are connected in series, and the switches SW1 to SW3, all of which are ON, are connected so as to be parallel to the resistor R11, between the ground wire L10 and the output wire L11, in the signal outputting portion 18. Therefore, the resistance value in the signal outputting portion 18 drops farther than when at time T2. As a result, the potential of the output wire L1 also drops to a potential V3 (potential V3<potential V2), as shown in FIG. 11.

Next, at time T4, the user releases his or her finger from the power switch 16. As a result, the power switch 16 returns to the normal state in which it is not being pushed, by an elastic member, not shown. Consequently, the switch SW3 shown in FIG. 10 turns OFF, and the resistance value of the signal outputting portion 18 rises. As a result, the potential of the output wire L1 changes from the potential V3 to the potential V2, as shown in FIG. 10.

At time T5, the user pushes the power switch 16 again. As a result, the switch SW3 turns ON, and the potential of the output wire L1 shown in FIG. 10 becomes the potential V3. At time T6, the user releases the power switch 16. As a result, the switch SW3 turns OFF, and the potential V of the output wire L1 becomes the potential V2.

Next, at time T7, the user opens the cover 12, and the switch SW1 shown in FIG. 10 turns OFF by this operation.

As a result, the resistance converting portion 60 becomes cut off inside the signal outputting portion 18. The resistor R10 and the resistor R11 are connected in series between the ground wire L10 and the output wire L11. Consequently, the resistance inside the signal outputting portion 18 rises, and the potential V of the output wire L1 becomes the potential V1 in FIG. 11.

At time T8, the user closes the cover 12. As a result, in FIG. 10, the switch SW1 turns ON. Because the switching portion 15 is not being pushed, the switch SW2 is also ON, and because the power switch 16 is also not being pushed, the switch SW3 is OFF.

Therefore, in the signal outputting portion 18, the resistor R10 and the resistor R11 are connected in series, and the resistor R12 is connected in parallel to the resistor R11, between the output wire L11 and the ground wire L10. Consequently, the potential V of the output wire L1 becomes the potential V2, as shown in FIG. 11.

Next, at time T9, the user pushes the switching portion 15. In FIG. 10, the switch SW2 turns OFF. As a result, in the signal outputting portion 18, the resistor R10 and the resistor R11 are connected in series between the ground wire L10 and the output wire L11, and the resistance converting portion 60 is cut off. Consequently, the potential V of the output wire L1 becomes the potential V1, as shown in FIG. 11. Also, the external power supply connector 10 can be pulled out by pushing the switching portion 15.

Next, at time T10, the user pulls the external power supply connector 10 out of the vehicle-side connecting portion 3. As a result, the signal terminal portion 22 is disconnected from the signal terminal portion 36, and the potential of the output wire L1 becomes the potential V0, as shown in FIG. 11.

The potential fluctuation of the output wire L1 has been described based on an example of a work operation performed by a worker, using FIG. 10 to FIG. 12 as described above. The control flow of the ECU 300 will be described in detail using FIG. 13.

Figure 13:
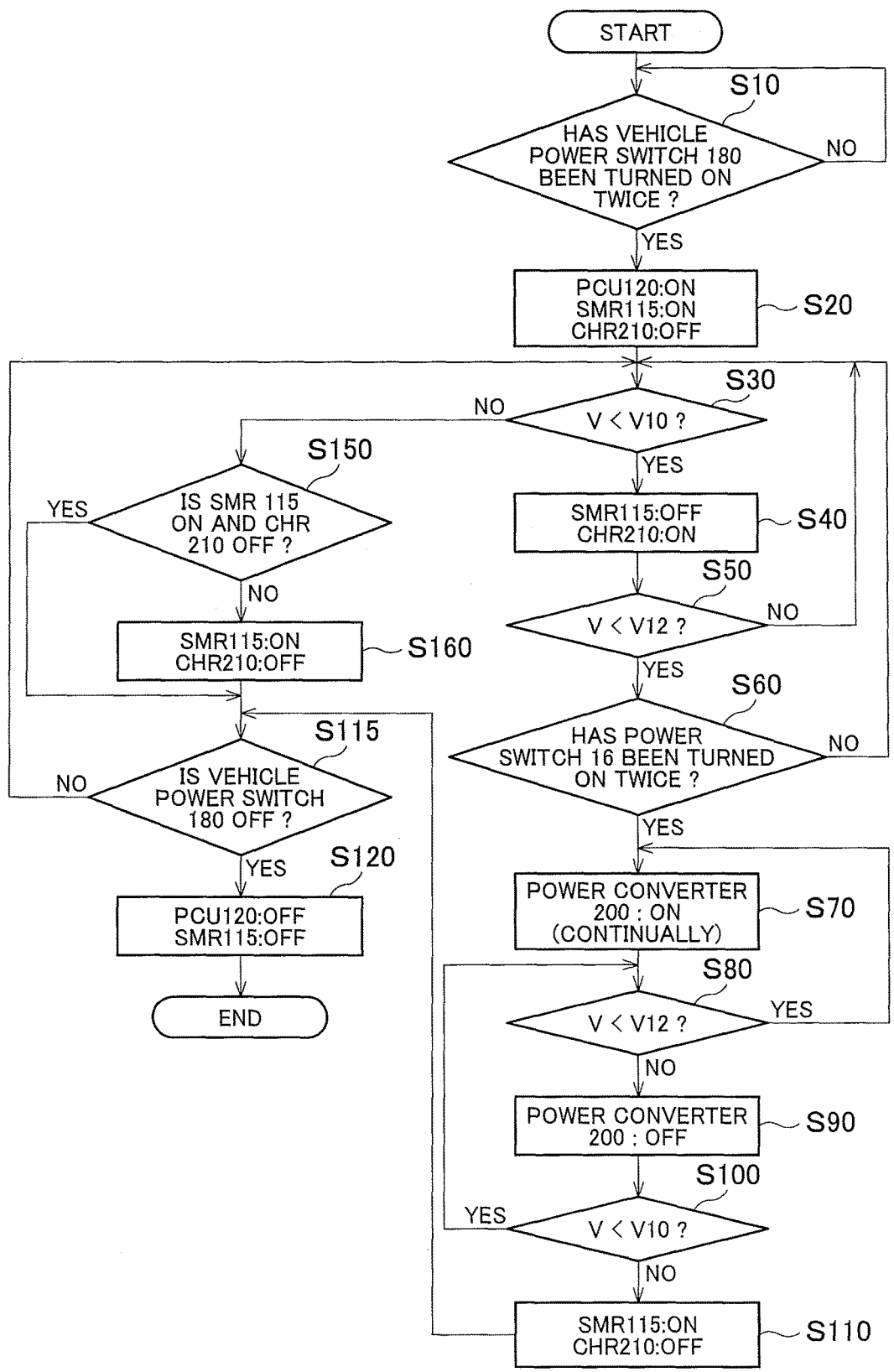
FIG. 13 is a view of a control flow of an ECU 300.

In FIG. 10 and FIG. 13, the ECU 300 determines whether the vehicle power switch 180 has been turned ON twice. If the ECU 300 determines that the vehicle power switch 180 has been pushed twice (YES in S10), the PCU 120 is activated, the SMR 115 is turned ON, and a CHR 210 is turned OFF (S20).

Next, the ECU 300 determines whether the potential of the output wire L1 is lower than a potential V10 (S30). As shown in FIG. 11, the potential V10 is a potential that is higher than the potential V1, and is a potential that is lower than the potential V0. The potential V10 is a threshold value that is stored in a storage element of the ECU 300 beforehand.

If the potential V of the output wire L1 is lower than the potential V10, the external power supply connector 10 is in a state at least fit into the vehicle-side connecting portion 3.

If the ECU 300 determines that the potential V of the output wire L1 is lower than the potential V10 (YES in S10), the ECU 300 turns the SMR 115 OFF, and turns the CHR 210 ON (S40).

At this time, the power converter 200 is not activated, so power from the battery 4 is not supplied to the vehicle-side connecting portion 3.

Next, the ECU 300 determines whether the potential V of the output wire L1 is lower than a potential V12 (S50). The potentials V11 and V12 are values that are higher than the potential V2, and lower than the potential V1; V12 is a threshold value stored in the ECU 300 beforehand.

If the ECU 300 determines that the potential V of the output wire L1 is equal to or greater than the potential V12 (NO in S50), the process proceeds on to S30. If the potential V is equal to or greater than the potential V12, the state is such that the external power supply connector 10 is fit into the vehicle-side connecting portion 3, but the switching portion 15 is being pushed or the cover 12 is open. For example, the state is that from time T1 to time T2 in FIG. 11.

On the other hand, if the potential V is lower than the potential V12, the state is such that the external power supply connector 10 and the vehicle-side connecting portion 3 are connected, and the cover 12 is closed. For example, the state is that from time T2 to time T3 in FIG. 11.

If the ECU 300 determines that the potential V of the output wire L1 is lower than the potential V12 (YES in S50), the ECU 300 determines whether the power switch 16 has been pushed twice (S60). If the ECU 300 is unable to detect that the power switch 16 has been pushed twice, the process proceeds on to S30 (NO in S60).

If the ECU 300 determines that the power switch 16 has been pushed twice (YES in S60), the ECU 300 activates the power converter 200 (S70). When the power converter 200 is activated, power starts to be supplied to the external power supply connector 10.

That is, in the first example embodiment, after the external power supply connector 10 is connected to the vehicle-side connecting portion 3, power starts to be supplied to the external power supply connector 10 by the power switch 16 as an operating portion being operated. In FIG. 11, the state is that shown at time T6, and power starts to be supplied to the external power supply connector 10, as shown in FIG. 12.

In the first example embodiment, the user operating the operating portion means that "the user pushes the power switch 16 twice". The operation of "pushing the power switch 16 twice" is one example of an example in which the user operates the operating portion. Another operation may be used instead of "pushing the power switch 16 twice".

The flow in which the ECU 300 determines "whether the user has pushed the power switch 16 twice" will be described later.

Next, the ECU 300 determines whether the potential V of the output wire L1 is lower than the potential V12 (S80). At this time, the subsequent two modes are conceivable as modes in which the potential V of the output wire L1 will become equal to or greater than the potential V12.

More specifically, the two modes are a state in which the user pushes the switching portion 15 after the external power supply connector 10 has been connected to the vehicle-side connecting portion 3 and power has been supplied, and a state in which the user opens the cover 12 after the external power supply connector 10 has been connected to the vehicle-side connecting portion 3 and power has been supplied.

When the user pushes the switching portion 15, it is assumed that the user will then pull the external power supply connector 10 out of the vehicle-side connecting portion 3.

Also, when the user opens the cover 12, it is assumed that the user will pull out the electric plug 53 that is currently connected to the external power supply connector 10 and will connect another electric plug 53 to the external power supply connector 10. The state is that shown from time T7 to time T8 in FIG. 11.

Then, if the ECU 300 determines that the potential V of the output wire L1 is lower than the potential V12 (YES in S80), the activated state of the power converter 200 is continued (S70). If the ECU 300 determines that the potential V of the output wire L1 is equal to or greater than the potential V12 (NO in S80), the ECU 300 stops activation of the power converter 200 (S90). When activation of the power converter 200 is stopped, the supply of power from the battery 4 to the external power supply connector 10 is interrupted, as shown from time T7 to time T8 in FIG. 12. At this time, the CHR 210 shown in FIG. 10 is ON, so power can easily start to be supplied to the external power supply connector 10 again by activating the power converter 200. In this specification, when the supply of power to the external power supply connector 10 is interrupted, it means that power from the battery 4 is not being supplied to the external power supply connector 10 due to stopping activation of the power converter 200, while the CHR 210 is ON.

By interrupting the supply of power to the external power supply connector 10 in this way, even if the user opens the cover 12 and pulls out the electric plug 53 that is connected to the external power supply connector 10, the electric plug 53 will be pulled out in a state in which voltage is not being applied between the electric plug 53 and the external connecting portion 41.

Also, even in a case in which the user opens the cover 12 and is about to connect another electric plug 53 to the external connecting portion 41, the electric plug 53 will be connected in a state in which there is not a large potential difference between the other electric plug 53 and the external connecting portion 41.

Next, the ECU 300 determines whether the potential V of the output wire L1 is lower than the potential V10 (S100). When the potential V of the output wire L1 is equal to or greater than the potential V10, it can be assumed that the external power supply connector 10 has been pulled out of the vehicle-side connecting portion 3. At this time, there is not a large potential difference between the vehicle-side connecting portion 3 and the external power supply connector 10, so the external power supply connector 10 can be successfully pulled out of the vehicle-side connecting portion 3.

If the ECU 300 has determined that the potential V is equal to or greater than the potential V10 (NO in S100), the ECU 300 turns the SMR 115 ON, and turns the CHR 210 OFF (S110).

As a result of the CHR 210 being turned OFF, power stops being supplied to the external power supply connector 10. When power stops being supplied to the external power supply connector 10 in this way, it means that the CHR 210 is OFF, and activation of the power converter 200 has stopped.

Next, the ECU 300 determines whether the vehicle power switch 180 has been turned OFF (S115). If the ECU 300 determines that the vehicle power switch 180 is OFF (YES in S115), the ECU 300 stops activation of the PCU 120, and turns the SMR 115 OFF (S120). Then, the control of the ECU 300 ends.

On the other hand, if the ECU 300 determines that the vehicle power switch 180 is not OFF, the process proceeds on to S30 described above.

Next, a case in which the ECU 300 has determined in S100 described above that the potential V of the output wire L1 is lower than the potential V10 (YES in S100) will be described.

In this case, at least one of a state in which the user is pushing the switching portion 15, and a state in which the cover 12 is open is conceivable. In this case, a case in which the switching portion 15 is released, and the external power supply connector 10 is again connected to the vehicle-side connecting portion 3, and a case in which the user finishes the work of changing the electric plug 53 and closes the cover 12, are conceivable.

Then, if the ECU 300 has determined in S100 that the potential V of the output wire L1 is lower than the potential V10, the ECU 300 again determines whether the potential V is lower than the potential V12 (S80).

Then, if the ECU 300 determines that the potential V is equal to or greater than the potential V12 (NO in S80), the stopped state of the power converter 200 is continued (S90).

Here, for example, the processes from S80 to S100 are repeatedly performed until the user finishes the work of changing the electric plug 53. Then when the user finishes the work of changing the electric plug 53 and closes the cover 12, the potential V of the output wire L1 becomes the potential V2, just like at time T8 in FIG. 11.

At this time, the ECU 300 determines in S80 that the potential V is lower than the potential V12 (YES in S80). Next, the ECU 300 activates the power converter 200 (S70). As a result, power starts to be supplied to the external power supply connector 10 again, as shown at time T8 in FIG. 12.

Therefore, for example, power starts to be supplied to the external power supply connector 10 again by the user closing the cover 12 again after changing the electric plug 53.

Next, a state in which the external power supply connector 10 has not been connected to the vehicle-side connecting portion 3 even once, and a state in which the external power supply connector 10 has been connected once and then the external power supply connector 10 has been pulled out again, are conceivable as cases in which the ECU 300 has determined in S30 described above that the potential V of the output wire L1 is equal to or greater than the potential V10.

If the ECU 300 determines in S30 that the potential V of the output wire L1 is equal to or less greater the potential V10 (NO in S30), the ECU 300 determines whether the SMR 115 is ON and the CHR 210 is OFF (S150).

If the ECU 300 determines that the SMR 115 is ON and the CHR 210 is not OFF (NO in S150), the ECU 300 turns the SMR 115 ON, and turns the CHR 210 OFF (S160).

Then, the ECU 300 determines whether the vehicle power switch 180 is OFF (S115). If the ECU 300 determines that the vehicle power switch 180 is not OFF, the process proceeds on to S30. If the ECU 300 determines in S150 described above that the SMR 115 is ON and the CHR 210 is OFF, the process proceeds on to S115, and the ECU 300 determines whether the vehicle power switch 180 is OFF.

Also, when the vehicle power switch 180 is OFF, the ECU 300 turns the PCU 120 OFF and turns the SMR 115 OFF (S120).

Then the process of the ECU 300 ends.

Next, the flow in which the ECU 300 determines "whether the user has pushed the power switch 16 twice" in S60 will be described.

Figure 14:
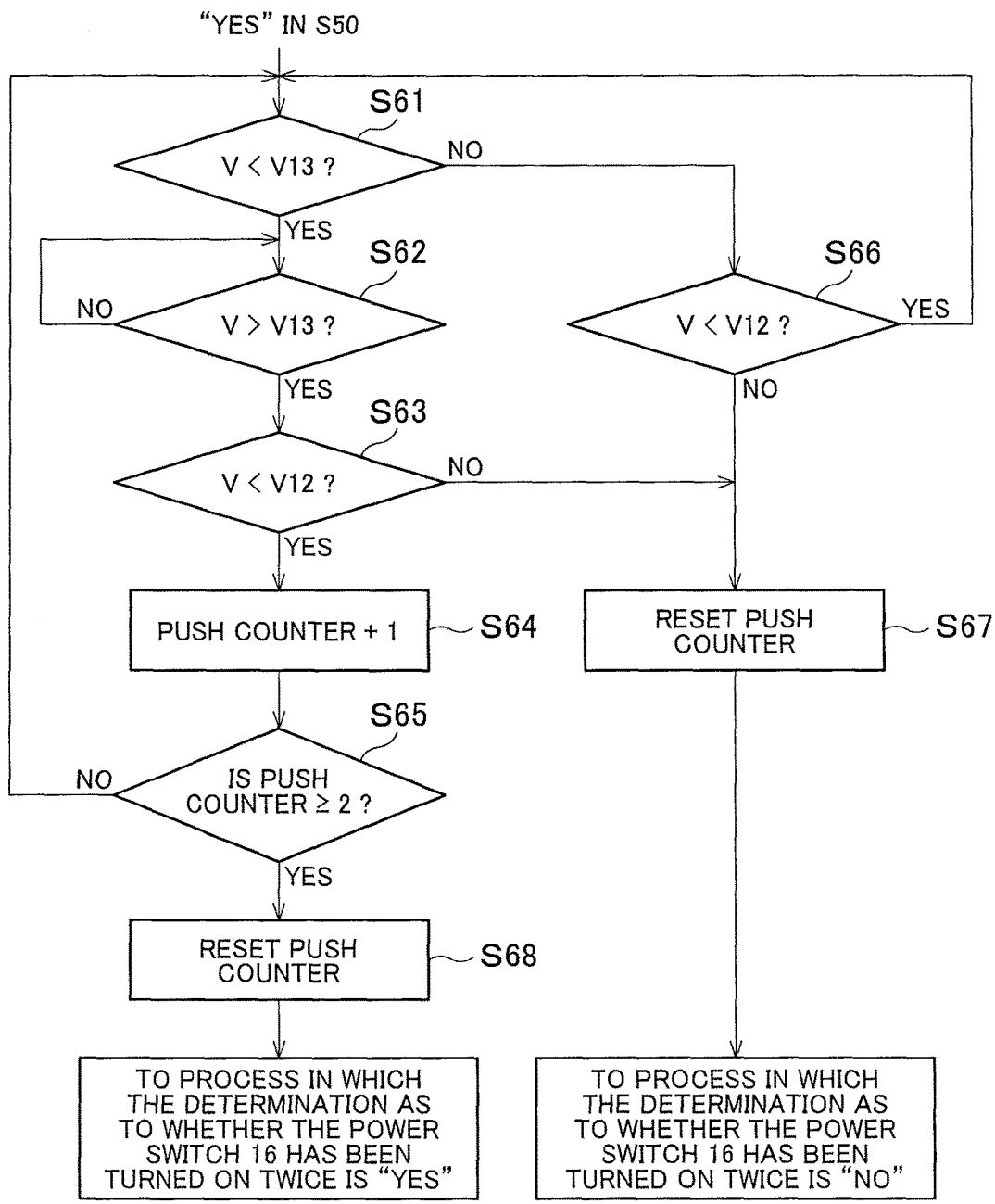
FIG. 14 is a flowchart for determining whether a power switch 16 has been pushed twice.

If the ECU 300 makes a determination of "YES" in S50 in FIG. 14, the ECU 300 determines whether the potential V of the output wire L1 is lower than a potential V13 (S61). The potential V13 is a value that is higher than the potential V3, and lower than the potential V2, and is a threshold value that is stored in advance in the ECU 300. The potential V14 is a value that is lower than the potential V3. When the potential V of the output wire L1 is lower than the potential V13, it can be assumed that the user has pushed the power switch 16 shown in FIG. 10.

If the ECU 300 determines that the potential V is lower than the potential V13 (YES in S61), the ECU 300 then determines whether the potential V has become higher than the potential V13 (S62).

That is, when the user releases the power switch 16, the potential of the potential V becomes higher than the potential V13. On the other hand, when the potential V is equal to or less than the potential V13, it can be assumed that the user is continuing to push the power switch 16. The state is that shown from time T3 to time T4 in FIG. 11.

Next, if the ECU 300 determines that the potential V is higher than the potential V13 (YES in S62), the ECU 300 determines whether the potential V is lower than the potential V12 (S63). When the user releases the power switch 16 after pushing the power switch 16, the potential V of the output wire L1 becomes the potential V2, as shown from time T4 to time T5 in FIG. 11.

If the ECU 300 determines that the potential V of the output wire L1 is lower than the potential V12 (YES in S63), the ECU 300 adds 1 to a "push counter" stored in the storage element of the ECU 300 (S64).

Next, the ECU 300 determines whether the "push counter" is equal to or greater than 2 (S65). If the ECU 300 determines that the "push counter" is lower than 2 (NO in S65), it returns to the process of S61. That is, the user has not yet pushed the power switch 16 more than once.

Next, the ECU 300 determines whether the potential V of the output wire L1 is lower than the potential V13 (S61). When the user stops pushing the power switch 16, the potential V of the output wire L1 will be the potential V2.

If the ECU 300 determines that the potential V is equal to or greater than the potential V13 (NO in S61), the ECU 300 then determines whether the potential V is lower than the potential V12 (S66).

Here, when the user has pushed the switching portion 15 or opened the cover 12, the potential V of the output wire L1 will be the potential V1. In this case, the process proceeds on to S67.

If the ECU 300 determines that the potential V of the output wire L1 is equal to or greater than the potential V12 (NO in S66), the ECU 300 resets the "push counter" (S67). Then, "the determination as to whether the power switch 16 has been turned ON twice is 'NO'", and the process proceeds on to the process after "S60" shown in FIG. 13.

On the other hand, if the ECU 300 determines in "S66" described above that the potential V is lower than the potential V12 (YES in S66), the process proceeds on to S61. The potential V is the potential V2 until the user finishes the first pushing operation and starts the second pushing operation. Then, when the user starts the second pushing operation, the potential V becomes the potential V3 as shown from time T5 to time T6 in FIG. 11.

If the ECU 300 determines in S61 that the potential V is lower than the potential V13 (YES in S61), the ECU 300 then determines whether the potential V is higher than the potential V13 (S62).

When the user continues to push the power switch 16, the potential V of the output wire L1 remains the potential V3.

Then, if the ECU 300 determines that the potential V of the output wire L1 is higher than the potential V13 (YES in S62), the ECU 300 then determines whether the potential V is lower than the potential V12 (S62). The potential V of the output wire L1 becomes the potential V2 by the user releasing the power switch 16. On the other hand, the potential V of the output wire L1 becomes the potential V1 when the user operates the switching portion 15 or opens the cover 12.

If the ECU 300 determines that the potential V is equal to or greater than the potential V12 (NO in S63), the ECU 300 resets the push counter (S67). Then, "the determination as to whether the power switch 16 has been turned ON twice is 'NO'", and the process proceeds on to the process after "S60" shown in FIG. 13.

If the ECU 300 determines in S63 described above that the potential V of the output wire L1 is lower than the potential V12 (YES in S63), the ECU 300 then adds 1 to the "push counter" stored in the storage element (S64).

Next, the ECU 300 determines whether the "push counter" is equal to or greater than 2 (S65). If the ECU 300 determines that the "push counter" is equal to or greater than 2, the ECU 300 resets the "push counter" (S68).

Then, "the determination as to whether the power switch 16 has been turned ON twice is 'YES'", and the process proceeds on to the process after "S60" shown in FIG. 13.

Figure 15:
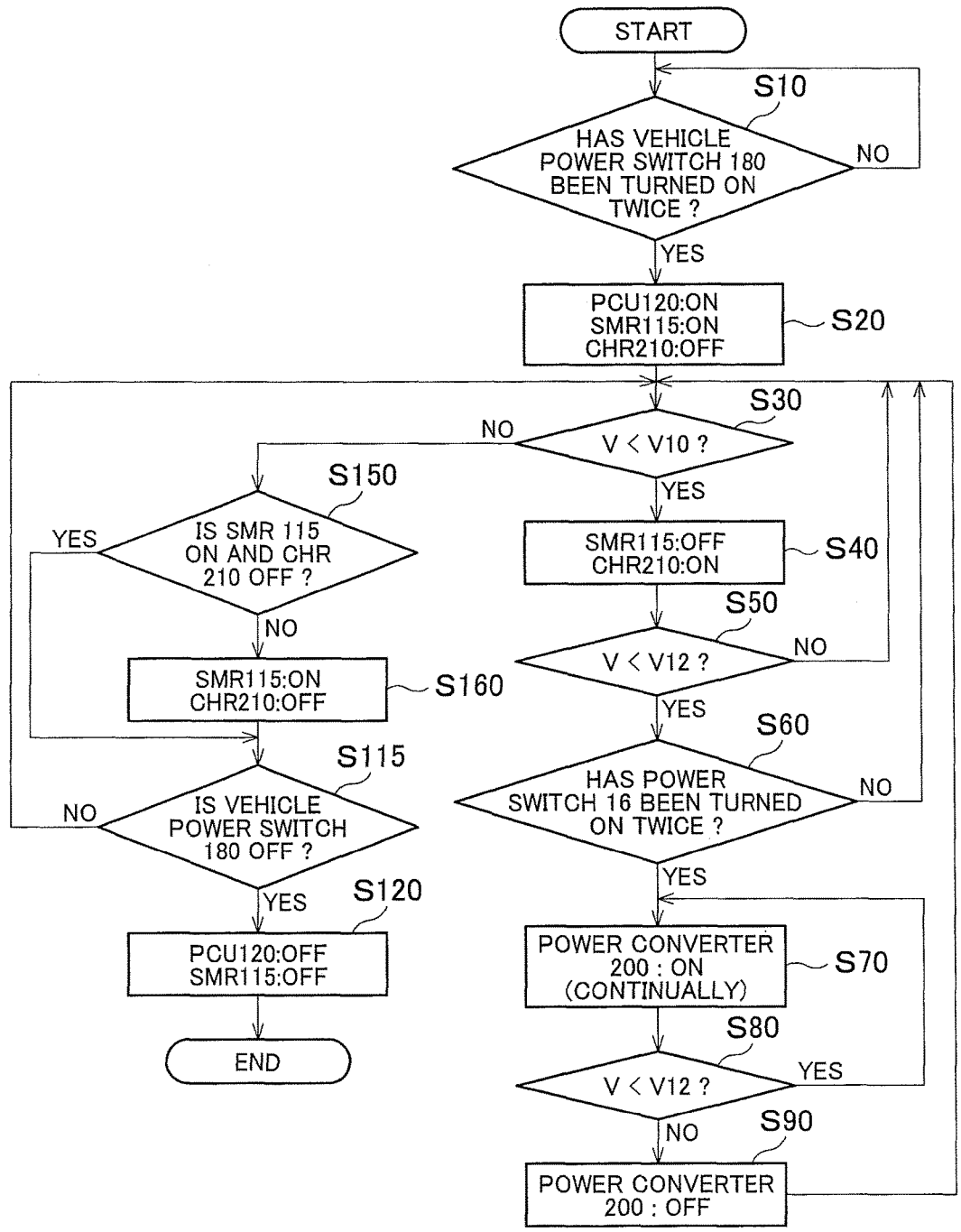
FIG. 15 is a flowchart of a modified example of the control flow according to the first example embodiment.

FIG. 15 is a flowchart illustrating a modified example of the control flow according to the first example embodiment. In the control flow shown in FIG. 13 described above, if the cover 12 is opened after power starts to be supplied to the external power supply connector 10, the supply of power is interrupted, and when the cover 12 is then closed, power starts to be supplied to the external power supply connector 10 again.

In the control flow shown in FIG. 15, even if the cover 12 is closed after the supply of power to the external power supply connector 10 is interrupted, power will start to be supplied to the external power supply connector 10 again after the user pushes the power switch 16 twice.

More specifically, a control flow according to the modified example will be described using FIG. 15. Descriptions of those portions that overlap with the flow shown in FIG. 13 will be omitted.

If the ECU 300 determines in S60 that the power switch 16 has been turned ON twice (YES in S60), the ECU 300 turns the power converter 200 ON, and supplies power to the external power supply connector 10 (S70).

Next, the ECU 300 determines whether the potential V of the output wire L1 is lower than the potential V12 (S80). If the ECU 300 then determines that the potential V is lower than the potential V12 (YES in S80), the ECU 300 will continue to drive the power converter 200 (S70).

On the other hand, if the ECU 300 determines that the potential V of the output wire L1 is equal to or greater than the potential V12 (NO in S80), the ECU 300 turns the power converter 200 OFF (S90). Here, as cases in which the potential V of the output wire L1 becomes equal to or greater than the potential V12, a case in which the user has opened the cover 12, a case in which the user has pushed the switching portion 15, and a case in which the external power supply connector 10 has been removed, are conceivable.

The process proceeds on to S30. If the ECU 300 determines that the potential V of the output wire L1 is lower than the potential V10 (YES in S30), the ECU 300 keeps the SMR 115 OFF and keeps the CHR 210 ON (S40).

A case in which the ECU 300 determines that the potential V is equal to or greater than the potential V10 in the process in S30 is a state in which that the external power supply connector 10 has been pulled out of the vehicle-side connecting portion 3, and then the processes of S150, S160, S115 and the like are performed.

Next, the ECU 300 determines whether the potential V of the output wire L1 is lower than the potential V12 (S50).

A case in which the potential V will become equal to or greater than the potential V12 is at least one of a state in which the cover 12 is open, and a state in which the switching portion 15 is being pushed.

Also, when the cover 12 is closed and the switching portion 15 is not being pushed, the potential V of the output wire L1 will become smaller than the potential V12.

For example, it is assumed that when the user changes the electric plug 53, the user will open the cover 12 and then close the cover 12 after changing the electric plug 53.

In this case, the potential V will become lower than the potential V12. In this case, the ECU 300 determines that the potential V of the output wire L1 is lower than the potential V12 (YES in S50), and then the ECU 300 determines whether the power switch 16 has been turned ON twice (S60). If the ECU 300 determines that the power switch 16 has been turned ON twice (YES in S60), the ECU 300 turns the power converter 200 ON (S70), and starts to supply power to the external power supply connector 10 again.

In this way, in the control flow shown in FIG. 15, once the supply of power to the external power supply connector 10 has been interrupted, the work of supplying power to the external power supply connector 10 will not be restarted unless the power switch 16 has been turned ON twice again.

Second Example Embodiment

The external power supply connector 10, the vehicle 1, and the external power supply system according to a second example embodiment will now be described using FIG. 16 to FIG. 19, and FIG. 3.

Figure 16:
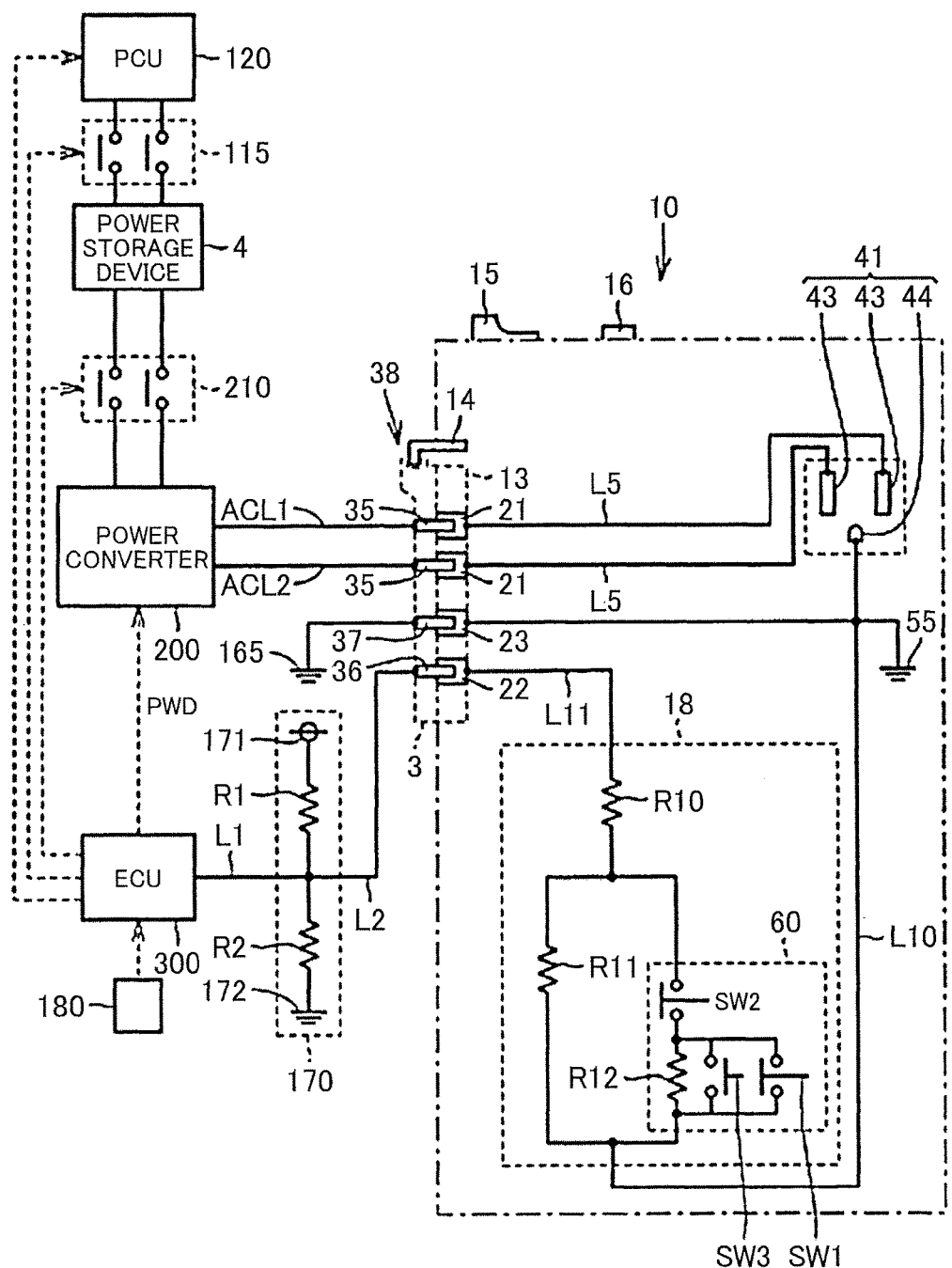
FIG. 16 is a block diagram showing a frame format of the vehicle 1 and the external power supply connector 10 according to a second example embodiment.

FIG. 16 is a block diagram showing a frame format of the vehicle 1 and the external power supply connector 10 according to the second example embodiment. When the switch SW1 according to the second example embodiment is no longer pushed by the protruding portion 47 in FIG. 3, the switch SW1 turns ON in FIG. 16.

In FIG. 16, the signal outputting portion 18 includes the resistor R10 and the resistor R11 that are connected in series between the ground wire L10 and the output wire L11, and the resistance converting portion 60 that is connected so as to be parallel to the resistor R11.

The resistance converting portion 60 includes the switch SW2 and the resistor R12 that are connected in series between the resistor R10 and the ground wire L10, and the switch SW1 and the switch SW3 that are connected so as to be parallel to the resistor R12.

Next, a change or the like in the potential of the output wire L1 when the user has connected or the like the external power supply connector 10 to the vehicle-side connecting portion 3 will be described using FIG. 17 and FIG. 18.

Figure 17:
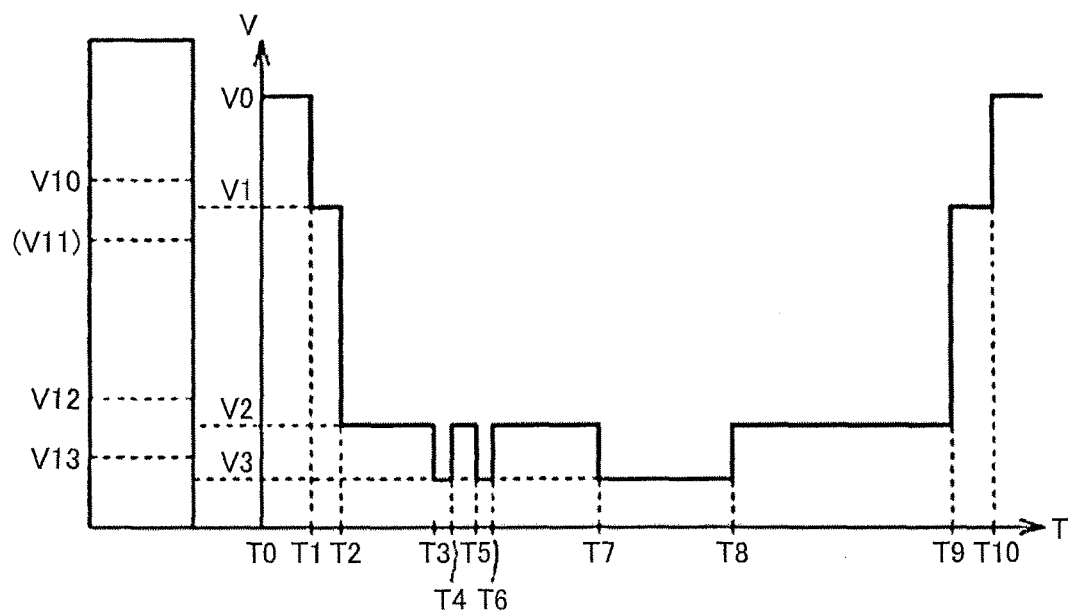
FIG. 17 is a graph showing potential fluctuation of the output wire L1 when the user connects the external power supply connector 10 to the vehicle-side connecting portion 3, or operates the external power supply connector 10.
Figure 18:
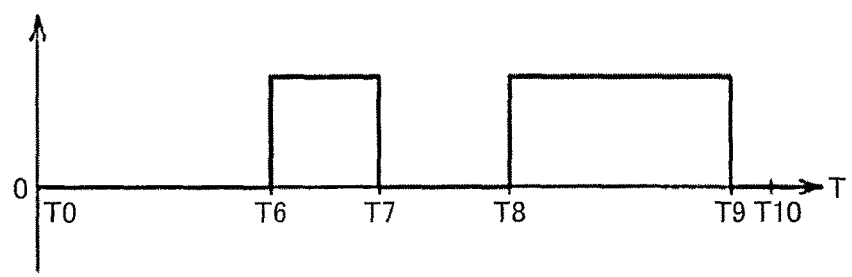
FIG. 18 is a graph illustrating the power supplied to the external connecting portion 41 when the operation shown in FIG. 17 is performed.

In FIG. 17, at time T0, the external power supply connector 10 is neither connected to nor fit into the vehicle-side connecting portion 3.

At time T1, the user fits the external power supply connector 10 into the vehicle-side connecting portion 3. The cover 12 of this external power supply connector 10 is closed. At this time, in FIG. 16, the signal terminal portion 22 is connected to the signal terminal portion 36, and the connection state detecting portion 170 is connected to the signal outputting portion 18. At this time, the switching portion 15 is being pushed, and the switch SW2 is OFF. Therefore, the potential V of the output wire L1 is the potential V1, as shown in FIG. 17.

Then, the user releases the switching portion 15 shown in FIG. 16, at time T2. As a result of the switching portion 15 being released, the switch SW2 turns ON.

At this time, the cover 12 is closed, so the switch SW1 is OFF. Also, the power switch 16 is not being pushed, so the switch SW3 is also OFF. Therefore, in the signal outputting portion 18, the resistor R10 and the resistor R11 are connected in series, and the resistor R12 is connected so as to be parallel to the resistor R11, between the ground wire L10 and the output wire L11.

Therefore, the resistance value of the signal outputting portion 18 drops, and the potential V of the output wire L1 changes from the potential V1 to the potential V2.

Next, at time T3, the user pushes the power switch 16 shown in FIG. 16. As a result of the user pushing the power switch 16, the switch SW3 turns ON. When the switch SW3 turns ON, the resistance value of the signal outputting portion 18 consequently drops. As a result, the potential V of the output wire L1 becomes the potential V3, as shown in FIG. 17.

Next, at time T4, the user releases the power switch 16 shown in FIG. 16. When the power switch 16 is released, the switch SW3 turns OFF. As a result, the resistance value of the signal outputting portion 18 rises, and the potential V of the output wire L1 also becomes the potential V2. Next, at time T5, the potential V of the output wire L1 becomes the potential V3 as a result of the power switch 16 being pushed. Next, at time T6, the potential V of the output wire L1 becomes the potential V2 as a result of the user releasing the power switch 16.

Next, in FIG. 17, at time T7, the user opens the cover 12. When the cover 12 is opened, the switch SW1 turns ON, and the resistance value of the signal outputting portion 18 drops. The potential V of the output wire L1 becomes the potential V3, as shown in FIG. 17.

Next, at time T8, the user closes the cover 12. When the cover 12 is closed, the switch SW1 turns OFF in FIG. 16. Therefore, the resistance value of the signal outputting portion 18 rises, and the potential V of the output wire L1 also rises from the potential V3 to the potential V2. When the cover 12 is open, the resistance value of the signal outputting portion 18 will not change even if the power switch 16 is pushed.

Next, at time T9, the user pushes the switching portion 15. When the switching portion 15 is pushed, the switch SW2 turns OFF in FIG. 16. As a result, the resistance value of the signal outputting portion 18 rises, and the potential V of the output wire L1 also rises from the potential V2 to the potential V1, as shown in FIG. 17.

Next, the user pulls the external power supply connector 10 out of the vehicle-side connecting portion 3 at time T10. At time T10, if it is determined that the potential V is higher than the potential V10, the ECU 300 stops the operation of supplying power to the external power supply connector 10.

Figure 19:
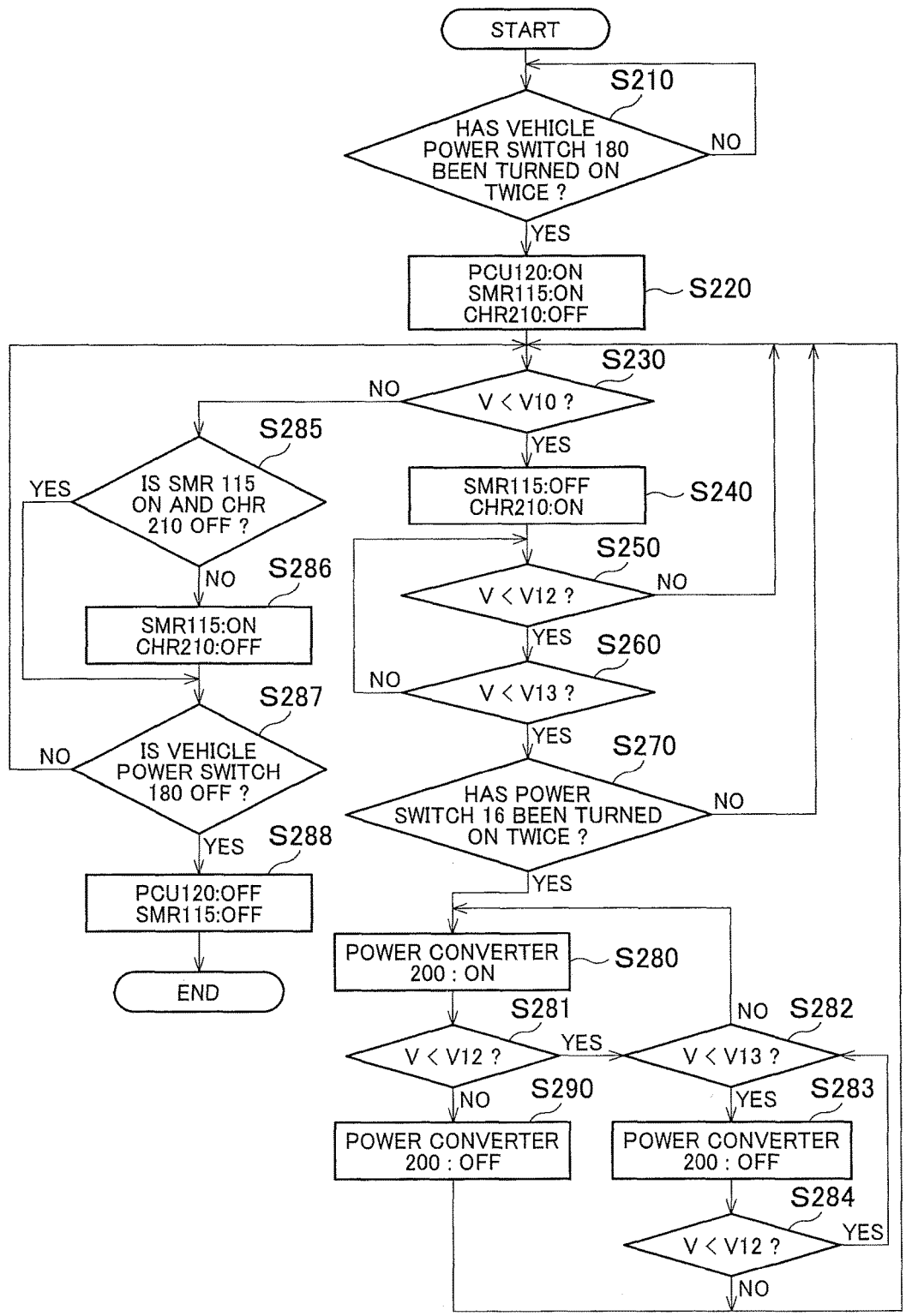
FIG. 19 is a view of a control flow of the ECU 300.

Next, a specific control flow of the ECU 300 will be described using FIG. 19 and the like. In FIG. 19, if the ECU 300 determines that the vehicle power switch 180 has been turned ON twice (YES in S210), the ECU 300 activates the PCU 120, turns the SMR 115 ON, and turns the CHR 210 OFF (S220).

Next, the ECU 300 determines whether the potential of the output wire L1 is lower than the potential V10 (S230). When the potential V of the output wire L1 is lower than the potential V10, the external power supply connector 10 is at the very least fit into the vehicle-side connecting portion 3. The state is that at time T1 shown in FIG. 17.

If the ECU 300 determines that the potential V of the output wire L1 is lower than the potential V10 (YES in S230), the ECU 300 turns the SMR 115 OFF, and turns the CHR 210 ON (S240). At this time, the power converter 200 is not activated. That is, "the supply of power to the external power supply connector 10 is interrupted".

Next, the ECU 300 determines whether the potential V of the output wire L1 is lower than the potential V12 (S250). When the potential V of the output wire L1 is equal to or greater than the potential V12, and equal to or less than the potential V10, the state is that at time T1 in FIG. 17.

If the ECU 300 determines that the potential V is lower than the potential V12 (YES in S250), the ECU 300 then determines whether the potential V is lower than the potential V13 (S260). A state in which the potential V of the output wire L1 is lower than the potential V12, and equal to or greater than the potential V13, is the state from time T2 to time T3 shown in FIG. 17.

If the ECU 300 determines that the potential V is lower than the potential V13 (YES in S260), the ECU 300 determines whether the power switch 16 has been turned ON twice. The control flow of this S2 will be described later.

If the ECU 300 determines that the power switch 16 has been turned ON twice (YES in S270), the ECU 300 activates the power converter 200 (S280). As a result, power starts to be supplied to the external power supply connector 10, as shown at time T6 in FIG. 18.

Next, the ECU 300 determines whether the potential V of the output wire L1 is lower than the potential V12 (S281). If the potential V of the output wire L1 is equal to or greater than the potential V12, it is assumed that the user has operated the switching portion 15 and the external power supply connector 10 is fit into the vehicle-side connecting portion 3.

If the ECU 300 has determined that the potential V is lower than the potential V12, the ECU 300 determines whether the potential V is lower than the potential V13 (S282).

Here, a case in which the user has opened the cover 12, and a case in which the user has pushed the power switch 16, while power is being supplied to the external power supply connector 10, are conceivable as states in which the potential V of the output wire L1 will become smaller than the potential V13. A case in which the user changes the electric plug 53 is conceivable as a case in which the user opens the cover 12. The state is that shown from time T7 to time T8 in FIG. 17.

Then, if the ECU 300 has determined that the potential V is lower than the potential V13, the ECU 300 turns the power converter 200 OFF, and stops driving the power converter 200 (S283). As a result, the supply of power to the external power supply connector 10 is interrupted, as shown from time T to time T8 in FIG. 18.

Then, the ECU 300 determines whether the potential V is lower than the potential V12 (S284). A case in which the user has pushed the switching portion 15 is conceivable as a case in which the potential V of the output wire L1 becomes equal to or greater than the potential V12.

If the ECU 300 determines that the potential V is lower than the potential V12, the process proceeds on to S282.

Also, when the user has finished changing the electric plug 53 and has closed the cover 12, the potential V of the output wire L1 becomes the potential V2 as shown at time T8 in FIG. 17.

As a result, in S282, the ECU 300 determines that the potential V is equal to or greater than the potential V13 (NO in S282), and the ECU 300 activates the power converter 200 (S280). As a result, power starts to be supplied to the external power supply connector 10 again, as shown at time T8 in FIG. 18. That is, when the supply of power to the external power supply connector 10 is interrupted by the cover 12 being opened, the supply of power is restarted by the cover 12 being closed. When the supply of power is interrupted by the power switch 16 being pushed, the supply of power is restarted by the power switch 16 being released.

Here, if the ECU 300 detects in S284 described above that the potential V is equal to or greater than the potential V12 (NO in S284), the process proceeds on to S230.

A case in which the user has pushed the switching portion 15 and the external power supply connector 10 has been fit into the vehicle-side connecting portion 3 is conceivable as a case in which the potential V becomes equal to or greater than the potential V12 in this way.

Then, the ECU 300 determines whether the potential V of the output wire L1 is lower than the potential V10 (S230). Here, if the ECU 300 determines that the potential V is lower than the potential V10 (YES in S230), the process proceeds on to S240.

On the other hand, if the ECU 300 determines that the potential V of the output wire L1 is equal to or greater than the potential V10 (NO in S230), the ECU 300 then determines whether the SMR 115 is ON and the CHR 210 is OFF (S285).

Then, if the ECU 300 determines that the SMR 115 is ON and the CHR 210 is not OFF, the ECU 300 turns the SMR 115 ON and turns the CHR 210 OFF (S286). Then the process proceeds on to S287.

If the ECU 300 determines in S285 that the SMR 115 is ON and the CHR 210 is OFF (YES in S285), the ECU 300 then determines whether the vehicle power switch 180 is OFF (S287).

Then, if the ECU 300 determines that the vehicle power switch 180 is not OFF, the process proceeds on to S230. If the ECU 300 determines in S287 that the vehicle power switch 180 is OFF (YES in S287), the ECU 300 then turns the SMR 115 OFF, and stops driving the PCU 120 (S288). Then, the ECU 300 ends the control.

A case in which the user has pushed the switching portion 15 when power is being supplied to the external power supply connector 10 is conceivable as a case in which the potential V becomes equal to or greater than the potential V12 in S281 as well.

Then, the ECU 300 stops driving the power converter 200 (S290). After this, the process proceeds on to S230 described above.

Also, a case in which the user has pushed the switching portion 15 is also conceivable in a case in which the potential V becomes higher than the potential V12 in S250. Therefore, If the ECU 300 determines in S250 that the potential V is equal to or greater than the potential V12, the process proceeds on to S230.

Then, the PCU 120 stops being driven by the potential V being higher than the potential V10 and the vehicle power switch 180 being turned OFF, for example, and the process ends.

Next, the control flow of S270 will be described using FIG. 20 to FIG. 23.

Figure 20:
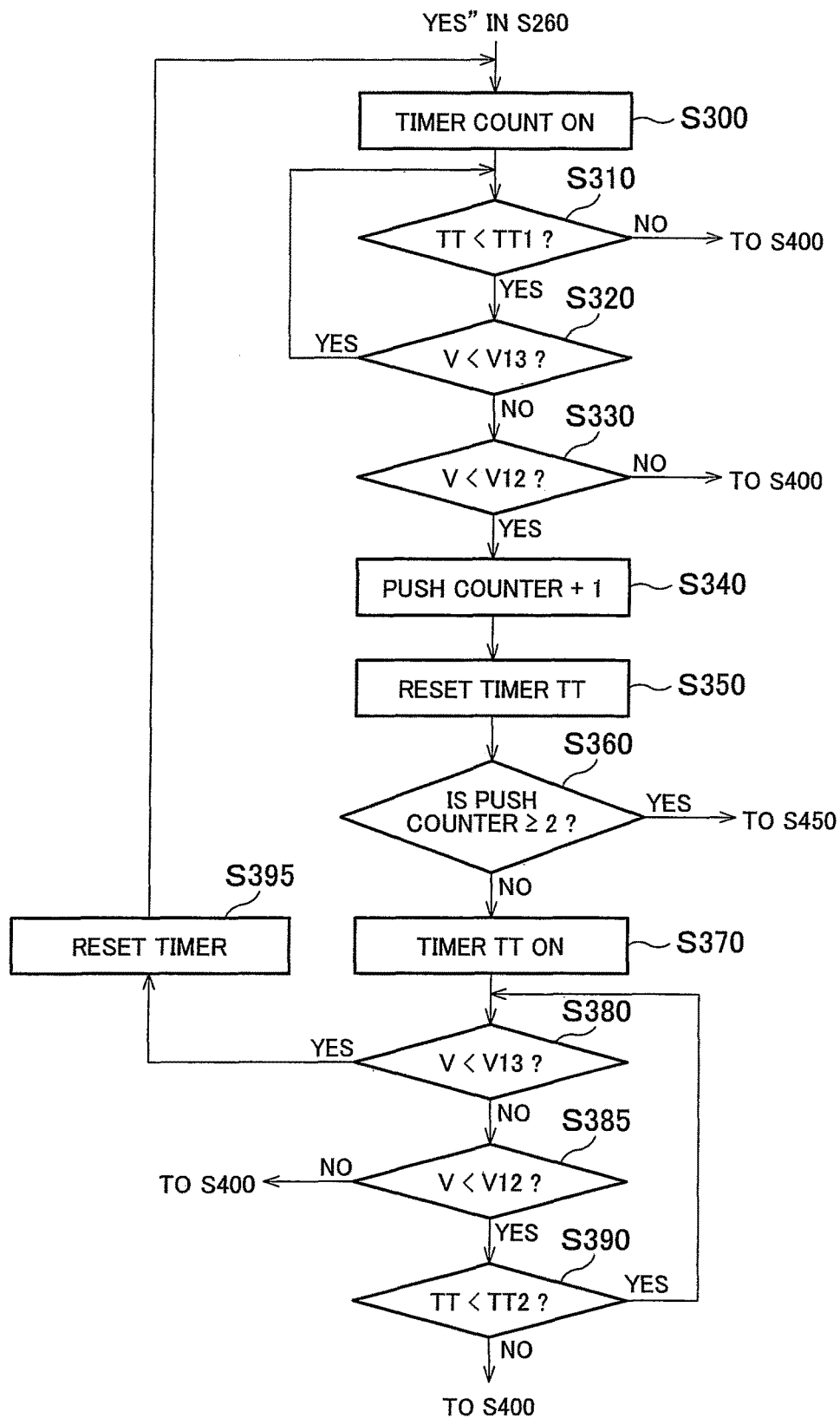
FIG. 20 is a flowchart of the processes in S270.

FIG. 20 is a flowchart illustrating the processes in S270. As shown in FIG. 20, if the ECU 300 makes a determination of "YES" in S260, the ECU 300 then starts a counter of a timer (S300).

Then, the ECU 300 determines whether a timer count TT is shorter than a set time TT1 (S310). The set time TT1 is a preset value that is stored in the storage element of the ECU 300.

IF the ECU 300 determines that the timer count TT is shorter than the set time TT1, the ECU 300 then determines whether the potential V of the output wire L1 is lower than the potential V13 (S320).

If the ECU 300 determines that the potential V is lower than the potential V13 (YES in S320), the process proceeds on to S310.

Here, in the second example embodiment, a state in which the cover 12 is open, and a state in which the power switch 16 is pushed, are conceivable as cases in which the potential V of the output wire L1 becomes lower than the potential V13. Then, in this example embodiment, the ECU 300 sets the set time TT1 to approximately 1 second. When the state in which the potential V of the output wire L1 becomes lower than the potential V13 has continued for equal to or longer than 1 second, the ECU 300 determines that the cover 12 is open. And when the state in which the potential V becomes lower than the potential V13 has continued for shorter than 1 second, the ECU 300 determines that the power switch 16 is pushed.

Then, if the ECU 300 determines that the timer count TT is lower than the set time T1 (YES in S310), the ECU 300 then determines whether the potential V of the output wire L1 is equal to or greater than the potential V12 (S330).

When the user releases his or her finger from the power switch 16, the potential V of the output wire L1 rises to the potential V2. On the other hand, the potential V will rise to the potential V1 when the user pushes the switching portion 15 as well.

If the ECU 300 determines that the potential V is lower than the potential V12 (YES in S330), the ECU 300 adds 1 to the push counter stored in the storage element (S340). This is because in this case it is assumed that the user pushed the power switch 16 for a time shorter than the set time TT1, and then stopped pushing the power switch 16, so normally it can be assumed that the power switch 16 has been pushed once.

Figure 21:
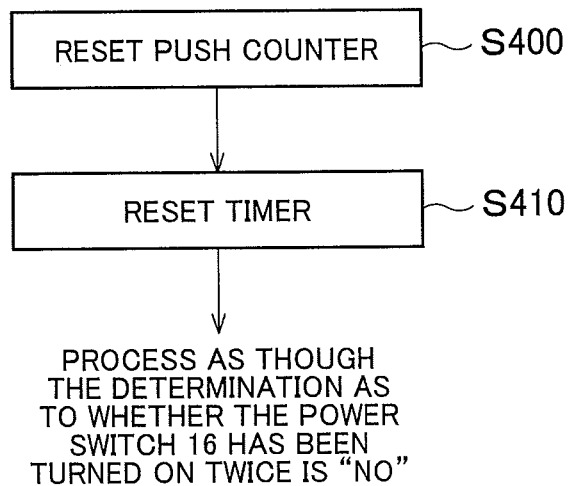
FIG. 21 is a flowchart when it has been determined that the power switch 16 has not been pushed twice.

On the other hand, if the ECU 300 determines that the pp is equal to or greater than the potential V12, the process of the ECU 300 proceeds on to S400 shown in FIG. 21. The processes in this case will be described later.

If the ECU 300 determines in S330 that the potential V is lower than the potential V12, the ECU 300 resets the count of the timer count IT (S350). Next, the ECU 300 determines whether the "push counter" is equal or greater than 2 (S360).

IF the ECU 300 determines that the number of the "push counter" is less than 2 (NO in S360), the ECU 300 starts the timer count TT (S370).

The ECU 300 then determines whether the potential V is lower than the potential V13 (S380). Here, as a case in which the potential V of the output wire L1 becomes lower than the potential V13, a case in which the user has pushed the power switch 16 again, and a case in which the user has opened the cover 12 again are conceivable.

Here, when the 16 is pushed two times consecutively, the interval between the first time and the second time may be within approximately 1 second, for example, while if the user opens and closes the cover 12 two times consecutively, the interval between the first opening and closing, and the second opening and closing may be several seconds, for example. Thus, it is determined that the power switch 16 has been pushed twice when the interval from after the potential V becomes lower than the potential V13 the first time until the potential V becomes lower than the potential V13 the second time is shorter than a set time TT2 set beforehand.

If the ECU 300 determines that the potential V is equal to or greater than the potential V13 (NO in S380), the ECU 300 then determines whether the potential V is lower than the potential V12 (S385). If the ECU 300 determines that the potential V is smaller than the potential V12 (Yes in S385), the ECU 300 then determines whether the timer count TT is smaller than the set time TT2 (S390). The set time TT2 is normally set based on the interval of time when the user pushes the power switch 16 two times consecutively, and is set to approximately 1 second, for example.

Here, if the ECU 300 determines that the timer count TT is shorter than the set time TT2 (YES in S390), the process returns to S380.

Then, if the user does not perform any operation for a predetermined period of time or more, the ECU 300 repeats S380, S385, S390, and the timer count TT becomes larger during that time. As a result, if the timer count TT is larger than the set time TT2, the ECU 300 determines in S390 that the timer count TT is high (NO in S390), and the process of the ECU 300 proceeds on to S400 shown in FIG. 21.

In FIG. 21, the ECU 300 resets the push counter (S400). Then, the ECU 300 resets the timer count TT (S410). Then the process proceeds onto the process in which the ECU 300 made the determination of "NO" in S270 shown in FIG. 19.

On the other hand, for example, if the user pushes the power switch 16 immediately after pushing the power switch 16 once, for example, the timer count TT will be smaller than the set time TT1, and the potential V of the output wire L1 will become smaller than the potential V13.

Therefore, in S380 in FIG. 20, the ECU 300 determines that the potential V is lower than the potential V13 (YES in S380), and the ECU 300 resets the timer count (S395). Then, the process returns to S300, and the ECU 300 starts the count of the timer (S300).

Here, when the period of time for which the user pushes the power switch 16 is shorter than the set time TT1 set beforehand, the processes of S310, S320, S330 and the like are performed, as described above, and the process proceeds on to the process of S340.

The ECU 300 adds 1 to the push count (S340), and then resets the count of the timer (S350). Then, the ECU 300 next determines whether the "push counter" stored in the storage element is equal to or greater than 2 (S360).

If the ECU 300 determines that the number of the push counter is equal to or greater than 2 (YES in S360), the process proceeds on to S450.

Figure 22:
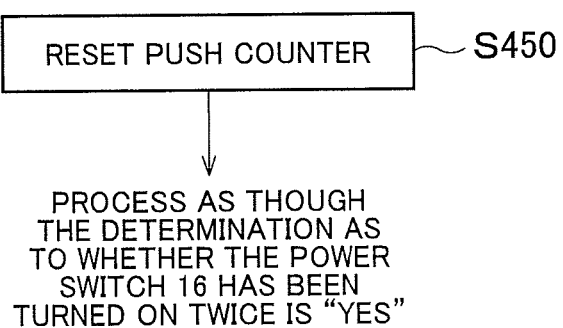
FIG. 22 is a flowchart when it has been determined that the power switch 16 has been pushed twice.

Then, as shown in FIG. 22, the ECU 300 resets the push counter (S450), and proceeds on to the process when the ECU 300 made a determination of "YES" in S270 in FIG. 19.

If the ECU 300 determines in S330, S385 in the flow shown in FIG. 20 that the potential V of the output wire L1 is equal to or greater than potential V12 (NO in S330, S385), the process of the ECU 300 proceeds on to S400, 5410 shown in FIG. 21. Then, the process of the ECU 300 proceeds on to the process in which the ECU 300 made a determination of "NO" in S270 in FIG. 19.

Also, if the timer count TT becomes equal to or greater than the set time TT1 in S310 in the flow shown in FIG. 20, the process of the ECU 300 proceeds on to S400.

This is because when the potential V is lower than the potential V13 for an extended period of time, it can be assumed that the user is not pushing the power switch 16, but has opened the cover 12.

Figure 23:
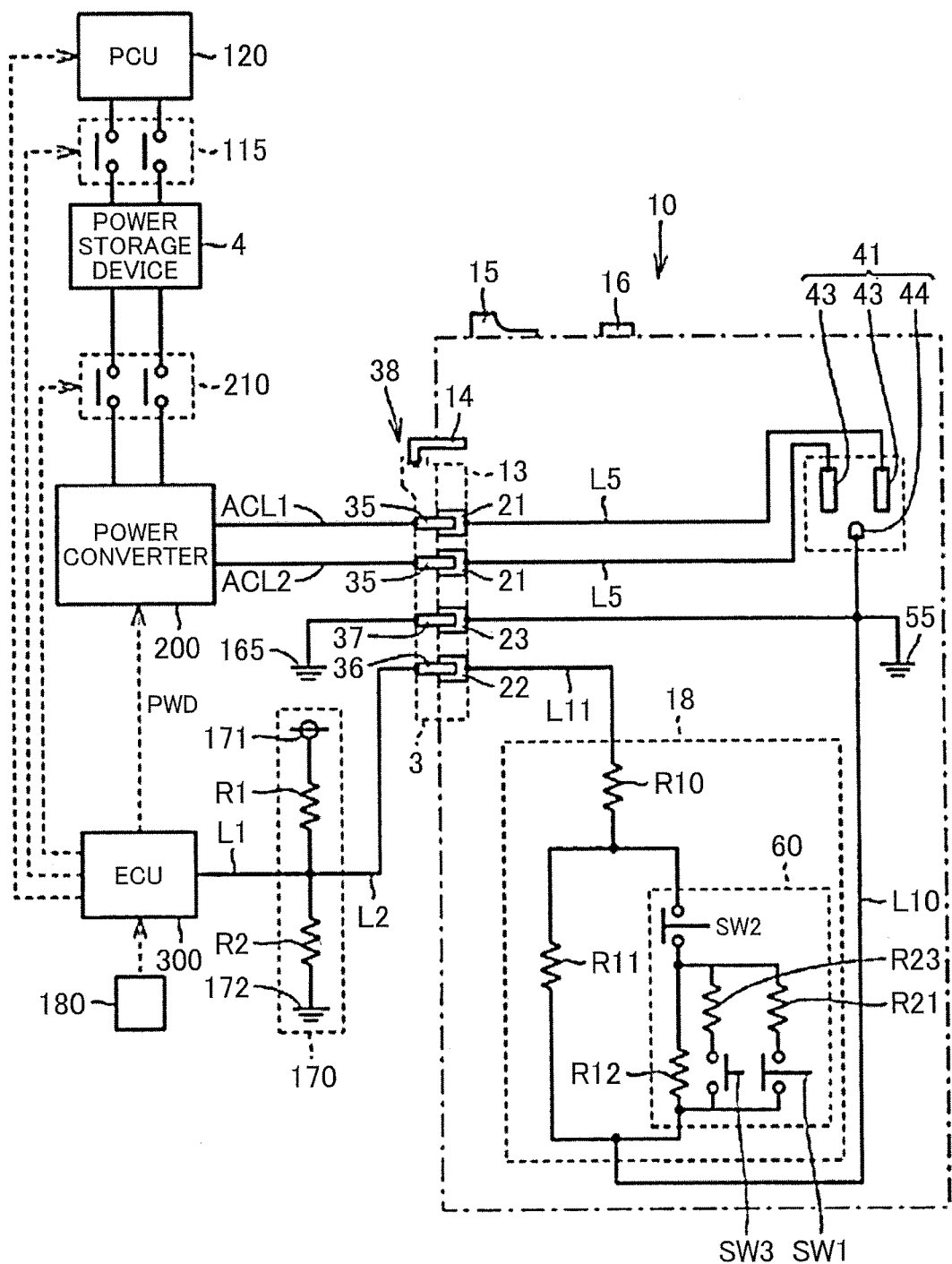
FIG. 23 is a block diagram of a first modified example of the external power supply connector 10 according to the second example embodiment.

FIG. 23 is a block diagram illustrating a first modified example of the external power supply connector 10 according to the second example embodiment. In FIG. 23, the external power supply connector 10 includes the signal outputting portion 18. The signal outputting portion 18 includes the resistor R10 and the resistor R11 that are connected in series between the ground wire L10 and the output wire L11, and the resistance converting portion 60 that is connected so as to be parallel to the resistor R11.

The resistance converting portion 60 includes the switches SW1 to SW3, the resistor R12, a resistor R21, and a resistor R23. The switch SW2 and the resistor R12 are connected in series between the resistor R10 and the ground wire L10.

The switch SW1 and the resistor R21 are connected in series, and a resistance converting element formed by the switch SW1 and the resistor R21 is connected in parallel to the resistor R12.

The switch SW3 and the resistor R23 are connected in series, and a resistance converting element formed by the switch SW3 and the resistor R21 is also connected in parallel to the resistor R12. A resistance value of the resistor R21 differs from the resistance value of the resistor R23.

Therefore, when the switch SW2 is ON, the potential V of the output wire L1 when the switch SW3 is OFF, the potential V of the output wire L1 when the switch SW3 is ON, and the potential V of the output wire L1 when the switch SW1 is OFF and the switch SW3 is OFF, are all able to be made different.

As a result, a case in which the power switch 16 is pushed and a case in which the cover 12 is open are easily distinguishable.

More specifically, the relationship between an operation by the user and the potential V of the output wire L1 will be described using FIG. 24. At time T1 in FIG. 24, the user fits the external power supply connector 10 into the vehicle-side connecting portion 3. At this time, the cover 12 is closed.

Here, at time T2, the user releases the switching portion 15, and the external power supply connector 10 is connected to the vehicle-side connecting portion 3. As a result, the switch SW2 turns ON. As a result, in the resistance converting portion 60, the resistor R11 and the resistor R10 are connected in series, and the resistor R12 is connected in parallel to the resistor R11, and the potential V of the output wire L1 becomes the potential V2.

From time T3 to T4 and time T5 to T6, the user pushes the power switch 16. As a result, the switch SW3 turns ON from time T3 to T4 and time T5 to T6. As a result, the potential V of the output wire L1 becomes the potential V3.

Then from time T7 to time T8, the user opens the cover 12. At this time, the power switch 16 is not being pushed, so the switch SW3 is OFF. On the other hand, the switch SW1 turns ON due to the cover 12 opening. The switch SW2 is ON. Also, the potential V of the output wire L1 becomes a potential V4.

Here, the resistance value of the resistor R21 shown in FIG. 23 differs from the resistance value of the resistor R23, so the potential V4 differs from the potential V3. In the example shown in FIG. 23, the resistance value of the resistor R21 is lower than the resistance value of the resistor R23.

Therefore, the ECU 300 is able to clearly distinguish between when the cover 12 is open and when the power switch 16 is pushed. Accordingly, it is possible to easily cut off the supply of power to the external power supply connector 10 when the cover 12 is open.

Also, the ECU 300 is able to easily determine whether the user has pushed the power switch 16 twice as an operation for starting the supply of power.

From time T10 to T11, the user pushes the power switch 16 while the cover 12 is open.

Figure 24:
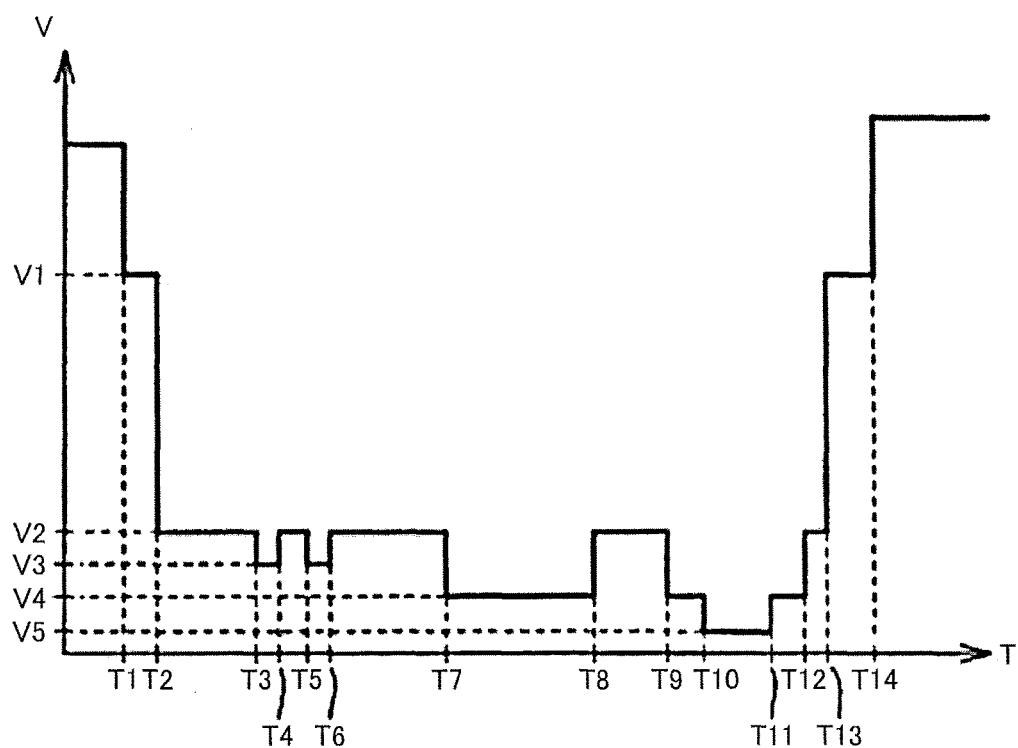
FIG. 24 is a graph illustrating the power supplied to the external connecting portion 41 when the operation shown in FIG. 23 is performed.

At this time, the switch SW1 and the switch SW3 shown in FIG. 23 are both ON, and the potential V of the output wire L1 is a potential V5, as shown in FIG. 24.

This potential V5 differs from all of V1, V2, V3, V4, so the ECU 300 is able to determine that the power switch 16 is pushed while the cover 12 is open.

In this way, in the example shown in FIG. 23, the external power supply connector 10 distinguishes between a signal when the switching portion 15 is pushed, a signal while the switching portion 15 is not being pushed, a signal when the cover 12 is open while the switching portion 15 is not being pushed, a signal when the power switch 16 is pushed while the switching portion 15 is not being pushed, and a signal when the power switch 16 is not being pushed while the 15 is not being pushed, and transmits them to the ECU 300.

Figure 25:
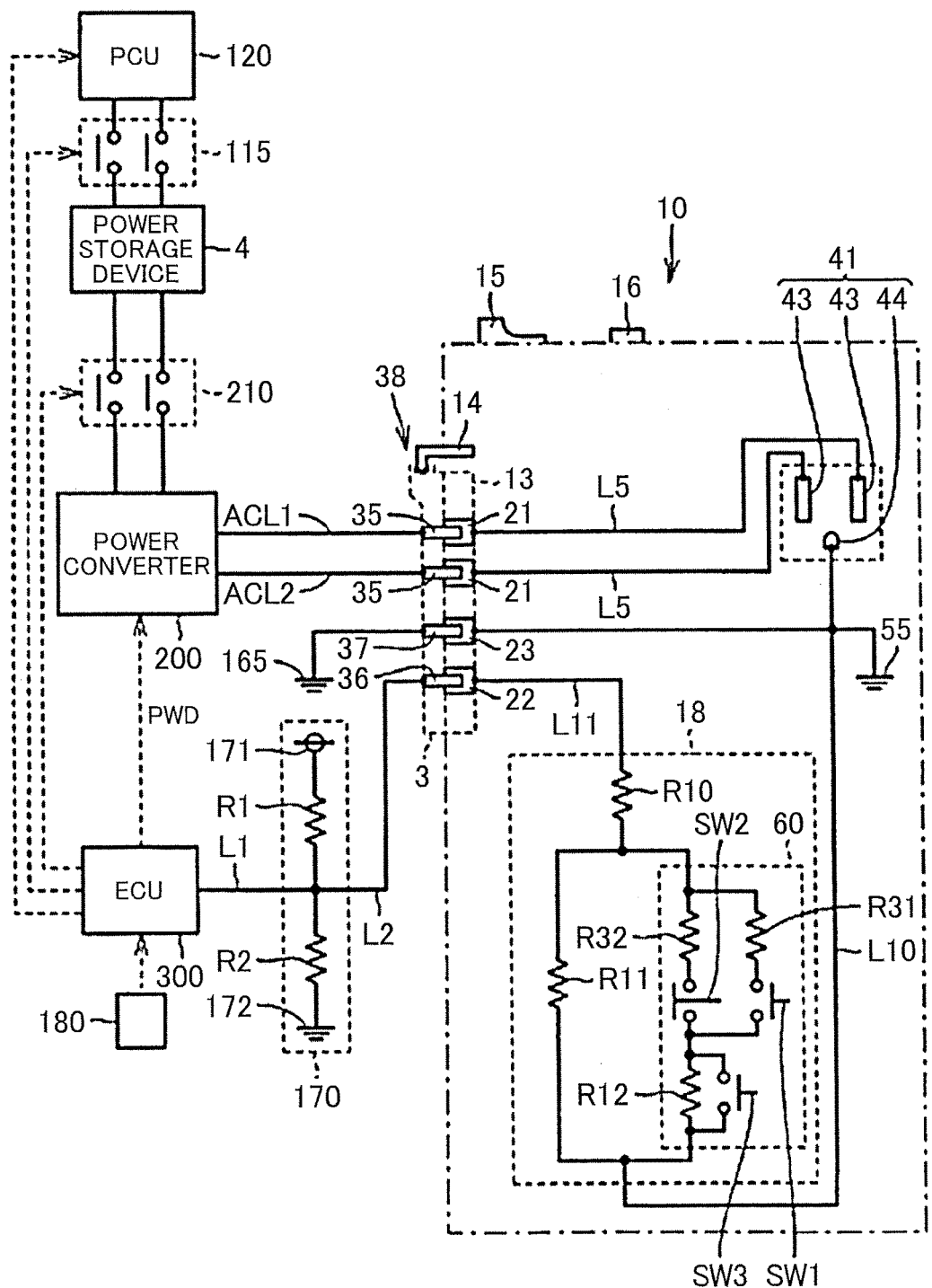
FIG. 25 is a block diagram of a frame format of the vehicle 1 and the external power supply connector 10 illustrating a second modified example.

FIG. 25 is a block diagram of the external power supply connector 10 and the vehicle 1 illustrating a second modified example. In the example shown in FIG. 25 as well, the signal outputting portion 18 includes the resistor R10 and the resistor R11, and includes the resistance converting portion 60 that is connected in parallel to the resistor R11.

The resistance converting portion 60 includes a resistor R32, the switch SW2, a resistor R31, the switch SW1, the resistor R12, and the switch SW3.

The resistor R32 and the switch SW2 are connected in series, and the resistor R12 is connected in series to the switch SW2. The switch SW3 is connected in parallel to the resistor R12.

The resistor R31 and the switch SW1 are connected in series. A resistance converting element that includes the resistor R31 and the switch SW1 is connected in parallel to a resistance converting element that includes the resistor R32 and the switch SW2. The switch SW1 turns ON when the cover 12 is closed.

Figure 26:
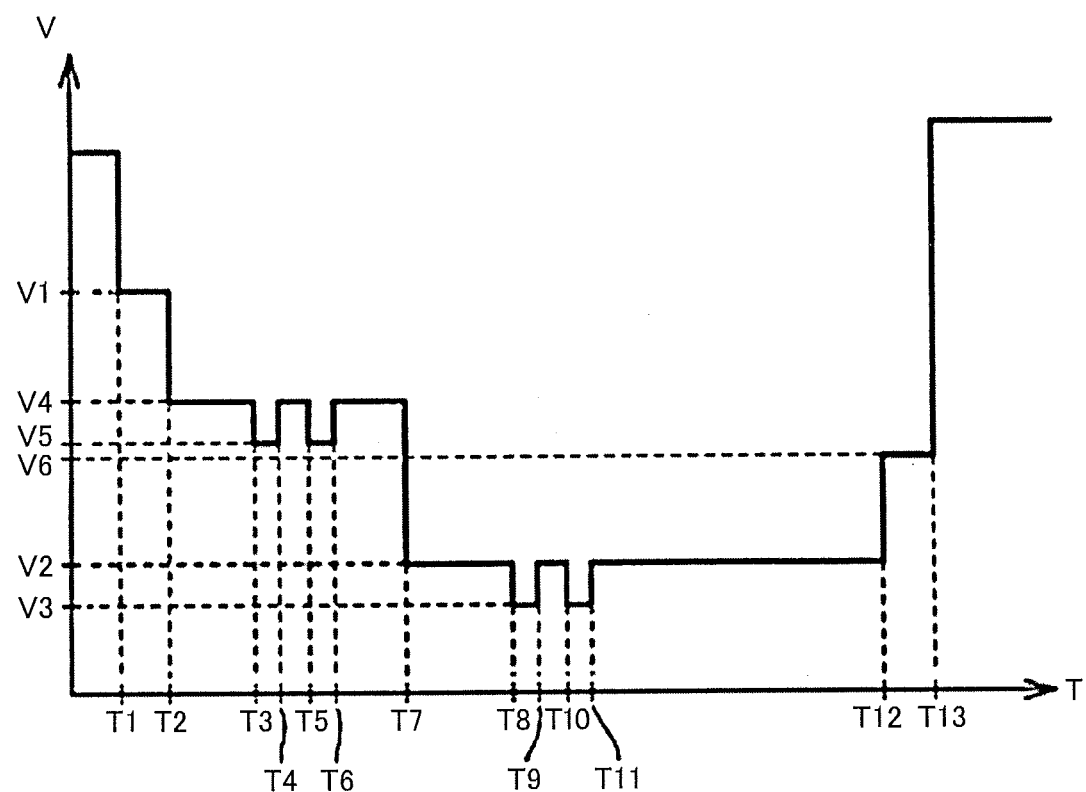
FIG. 26 is a graph of a potential V of the output wire L1 when the user operates the external power supply connector 10 shown in FIG. 24.

FIG. 26 is a graph illustrating the potential V of the output wire L1 when the user operates the external power supply connector 10 shown in FIG. 24.

At time T1 in FIG. 26, the user fits the external power supply connector 10 while the cover 12 is open into the vehicle-side connecting portion 3.

At this time, the switching portion 15 is being pushed, and the switch SW2 is OFF. The cover 12 is open, so the switch SW1 is OFF. The power switch 16 is not being pushed, so the switch SW3 is OFF. The potential V of the output wire L1 at this time is potential V1.

Then at time T2, the user releases the switching portion 15. At this time, the cover 12 is opened. At this time, the switch SW2 is ON, the switch SW1 is OFF, and the switch SW3 is also OFF. The potential V of the output wire L1 at this time is the potential V4.

From time T3 to time T4, and time T5 to time T6, the user is pushing the power switch 16.

As a result of the power switch 16 being pushed, the switch SW3 turns ON, and the resistance value of the signal outputting portion 18 drops. As a result, the potential V of the output wire L1 also drops from the potential V4 to the potential V5. At this time, the cover 12 is open, and the switch SW1 is OFF.

Then at time T7, the user closes the cover 12 without pushing the power switch 16. As a result, the switch SW1 turns ON, and the resistance value of the signal outputting portion 18 becomes lower than the resistance value of the signal outputting portion 18 at time T2.

As a result, the potential V of the output wire L1 becomes the potential V2. The resistance values of the resistor R31 and the resistor R12 are set such that the potential V2 becomes lower than the potential V5.

Then from time T8 to time T9, and time T10 to time T11, the user pushes the power switch 16. As a result, the switch SW3 turns ON. At this time, the switch SW1 and the switch SW2 are both ON. As a result, the potential V of the output wire L1 becomes the potential V3.

Then at time T12, the user pushes the switching portion 15 while the cover 12 is closed. As a result, the switch SW2 turns OFF. The cover 12 is closed, so the switch SW1 is OFF. The power switch 16 is not being pushed, so the switch SW3 is OFF. At this time, the potential V of the output wire L1 rises from the potential V2, and becomes a potential V6. In this state, when the cover 12 is opened at time T13, the resistance value of the signal outputting portion 18 will rise, and the potential V of the output wire L1 will become the potential V1.

Then at time T14, the user pulls the external power supply connector 10 with the closed cover 12 out of the vehicle-side connecting portion 3.

In this way, in the example shown in FIG. 25, the external power supply connector 10 distinguishes between a signal when the switching portion 15 is pushed, a signal while the switching portion 15 is not being pushed, a signal when the cover 12 is closed, a signal when the cover 12 is opened, a signal when the power switch 16 is pushed, and a signal when the power switch 16 is not being pushed, and transmits them to the ECU 300.

In the example shown in FIG. 25 as well, the ECU 300 is able to individually determine whether the switching portion 15 is being pushed, whether the cover 12 is open, and whether the power switch 16 is being pushed.

Figure 27:
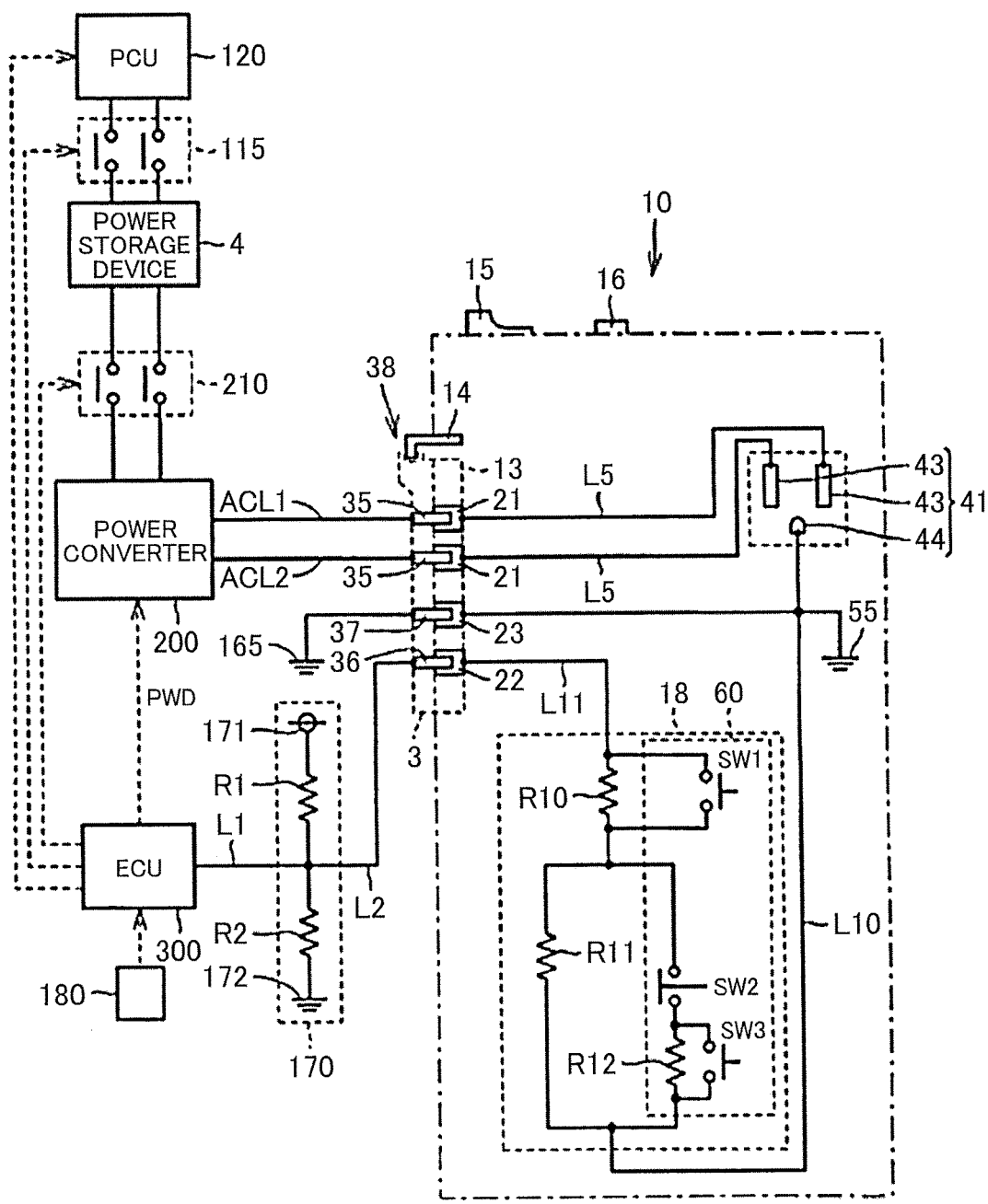
FIG. 27 is a block diagram of the vehicle 1 and the external power supply connector 10 illustrating a third modified example of the external power supply connector 10.

FIG. 27 is a block diagram of the external power supply connector 10 and the vehicle 1 that illustrates a third modified example of the external power supply connector 10.

In the example shown in FIG. 27, the switch SW1 is connected so as to be parallel to the resistor R10.

In the example shown in FIG. 27, the switch SW1 turns OFF when the cover 12 is closed, and turns ON when the cover 12 is opened.

In the example shown in FIG. 27 as well, the external power supply connector 10 is able to distinguish between a signal when the switching portion 15 is pushed, a signal while the switching portion 15 is not being pushed, a signal when the cover 12 is closed, a signal when the cover 12 is opened, a signal when the power switch 16 is pushed, and a signal when the power switch 16 is not being pushed, and transmit them to the ECU 300.

In the first and second example embodiments described above, a switch is made between a restricting state in which the electric plug 53 that is connected to the external connecting portion 41 is restricted from being unplugged, and the electric plug 53 is restricted from being connected to the external connecting portion 41, and an allowing state in which the electric plug 53 is allowed to be unplugged from the external connecting portion 41, and the electric plug 53 is allowed to be connected to the external connecting portion 41, depending on the cover 12.

In this way, the structure member that switches between the restricting state and the allowing state is not limited to the cover 12.

Figure 28:
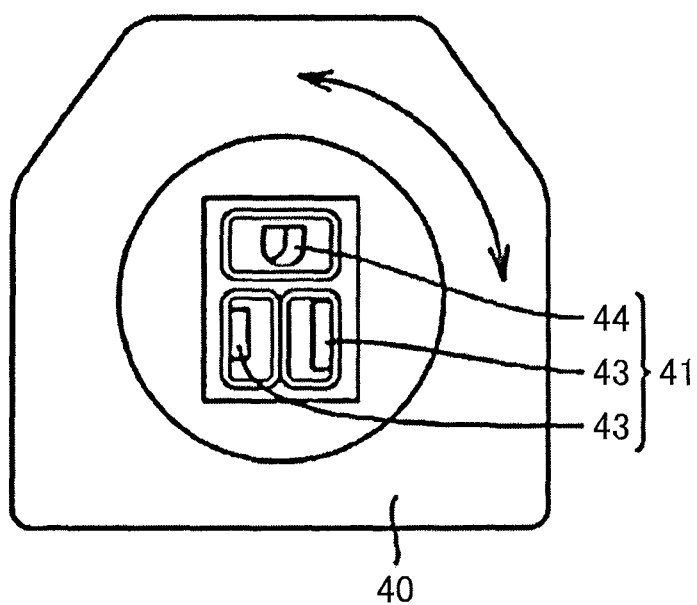
FIG. 28 is a perspective view of a modified example of a restricting member.

For example, in the example shown in FIG. 28, the external connecting portion 41 is provided so as to be able to rotate approximately 90 degrees on the rear end wall 40.

This external connecting portion 41 is formed such that the electric plug 53 is able to be connected to the external connecting portion 41, and the electric plug 53 that is connected to the external connecting portion 41 is able to be unplugged, in the state shown in FIG. 28.

Also, the external connecting portion 41 is formed such that when rotated 90 degrees from the state shown in FIG. 28, the electric plug 53 is not able to be connected to the external connecting portion 41, and the electric plug 53 that is connected to the external connecting portion 41 is not able to be unplugged.

In this way, a variety of mechanisms may be employed as the structure member that switches between the restricting state in which the electric plug 53 that is connected to the external connecting portion 41 is restricted from being unplugged, and the electric plug 53 is restricted from being connected to the external connecting portion 41, and the allowing state in which the electric plug 53 is allowed to be unplugged from the external connecting portion 41, and the electric plug 53 is allowed to be connected to the external connecting portion 41.

The scope of the invention is indicated by the scope of the claims, and is intended to include all modifications within the scope and meanings equivalent to the scope of the claims. Furthermore, the numerical values and the like described above are only examples, and are not limited to the numerical values and ranges described above.

INDUSTRIAL APPLICABILITY

The invention is able to be applied to an external power supply connector, a vehicle, and an external power supply system.

DESCRIPTION OF THE REFERENCE NUMERALS

1 VEHICLE, 2 BODY, 3 VEHICLE-SIDE CONNECTING PORTION, 4 BATTERY, 5 FUEL TANK, 7, 12 COVER, 9 CHARGING CONNECTOR, 10 EXTERNAL POWER SUPPLY CONNECTOR, 11 DEVICE MAIN BODY, 13 DEVICE-SIDE CONNECTING PORTION, 14, 38 ENGAGING PORTION, 15 SWITCHING PORTION, 16 POWER SWITCH, 17 BODY PORTION, 18 SIGNAL OUTPUTTING PORTION, 20, 32, 33, 34 CYLINDRICAL PORTION, 21, 35 POWER TERMINAL PORTION, 22, 36 SIGNAL TERMINAL PORTION, 23, 37 GROUND TERMINAL PORTION, 30 ECU, 31 INNER CYLINDRICAL PORTION, 35 POWER TERMINAL PORTION, 36 SIGNAL TERMINAL PORTION, 38a, 38b SIDE WALL, 38c BACK WALL, 38d FRONT WALL PORTION, 38e ENGAGING HOLE, 39 GROOVE, 40 REAR END WALL, 41 EXTERNAL CONNECTING PORTION, 42 EAVE PORTION, 43 POWER TERMINAL, 44 GROUND TERMINAL, 45 ROTATING SHAFT, 46 WATERPROOF HINGE PORTION, 47 PROTRUDING PORTION, 48 COVER MAIN BODY, 49 CORD PULL-OUT HOLE, 50 SEAL MEMBER, 51 INNER SEAL PIECE, 52 OUTER SEAL PIECE, 53 ELECTRIC PLUG 54 CORD, 55 CONNECTOR EARTH, 60 RESISTANCE CONVERTING PORTION, 72, 165, 172 VEHICLE EARTH, 90 EXTERNAL DEVICE, 121 CONVERTER, 122, 123 INVERTER, 130, 135 MOTOR-GENERATOR, 140 POWER TRANSMITTING GEAR, 150 DRIVING WHEEL, 160 ENGINE, 170 CONNECTION STATE DETECTING PORTION, 171 POWER SUPPLY NODE, 180 VEHICLE POWER SWITCH, 200 POWER CONVERTER

What is claimed is:
1. An external power supply connector for being attached to a vehicle-side connecting portion of a vehicle, the external power supply connector being configured to supply power from the vehicle to outside the vehicle, the vehicle including the vehicle-side connecting portion and an electronic control unit, and the electronic control unit being configured to control an operation to supply power to the vehicle-side connecting portion, the external power supply connector comprising:
a device main body including an external connecting portion, an electric plug being connected to the external connecting portion, and the electric plug being configured to supply the power to an external device;
a restricting member able to switch between a restricting state and an allowing state, the restricting state being a state in which the electric plug is restricted from being attached and detached to and from the external connecting portion, and the allowing state being a state in which the electric plug can be attached and detached to and from the external connecting portion;
a signal outputting portion configured to output a signal to the electronic control unit when in the allowing state, the signal prohibiting power from being supplied to the external power supply connector; and
a detecting portion configured to detect the restricting state and the allowing state of the restricting member.

2. The external power supply connector according to claim 1, wherein
the restricting member is a cover that is movably provided on the device main body;
the cover is provided movable in an open direction from a closed state to an open state, and the cover is provided movable in a closed direction so as to be placed in the closed state from the open state,
the closed state is a state in which the cover covers the external connecting portion,
the open state is a state in which the external connecting portion is exposed to the outside, and
the restricting state is a state in which the cover is in the closed state, and the allowing state is a state in which the cover is in the open state.

3. The external power supply connector according to claim 1, wherein the signal outputting portion outputs a signal to supply power to the external power supply connector to the electronic control unit, when the external power supply connector is connected to the vehicle-side connecting portion, and the restricting member is changed from the allowing state to the restricting state.

4. The external power supply connector according to claim 1, the external power supply connector being able to be operated by a user, and the external power supply connector further comprising:
a device-side connecting portion provided on the device main body, the device-side connecting portion fitting together with the vehicle-side connecting portion;
a device-side engaging portion configured to engage with a vehicle-side engaging portion provided on the vehicle; and
a switching portion operated by the user, the switching portion being configured to switch between an engaged state and a released state, the engaged state being a state in which the device-side engaging portion engages with the vehicle-side engaging portion, and the released state being a state in which the engaged state is released,
wherein the external power supply connector is connected to the vehicle-side connecting portion by fitting the device-side connecting portion together with the vehicle-side connecting portion, and engaging the device-side engaging portion with the vehicle-side engaging portion, the signal outputting portion is configured to output a signal to the electronic unit, when the switching portion is operated so as to be placed in the released state while the external power supply connector is connected to the vehicle-side connecting portion, and
the signal prohibits power from being supplied to the external power supply connector.

5. The external power supply connector according to claim 1, the external power supply connector being able to be operated by a user, and the external power supply connector further comprising:
an operating portion operated by the user,
wherein the signal outputting portion outputs a signal to the electronic control unit, when the operating portion is operated while the external power supply connector is connected to the vehicle-side connecting portion, and the restricting member is in the restricting state, and
the signal is to supply power to the external power supply connector.

6. The external power supply connector according to claim 1, the external power supply connector being able to be operated by a user, and the external power supply connector further comprising:
a device-side connecting portion provided on the device main body, the device-side connecting portion being connected to the vehicle-side connecting portion;
a device-side engaging portion configured to engage with a vehicle-side engaging portion provided on the vehicle;
a switching portion operated by the user, the switching portion being configured to switch between an engaged state and a released state, the engaged state being a state in which the device-side engaging portion engages with the vehicle-side engaging portion, and the released state being a state in which the engaged state is released; and
an operating portion operated by the user,
wherein the signal outputting portion outputs following signals:
a first signal indicating that the restricting member is in the allowing state;
a second signal indicating that the restricting member is in the restricting state;
a third signal indicating that the switching portion has been operated such that the device-side engaging portion is placed in the engaged state;
a fourth signal indicating that the switching portion has been operated such that the device-side engaging portion is placed in the released state; and
a fifth signal indicating that the operating portion has been operated by the user.

7. A vehicle for supplying power to an external device by an external power supply connector, the external power supply connector including a device main body and a restricting member, the device main body including an external connecting portion, an electric plug being connected to the external connecting portion, the electric plug being connected to the external device, the restricting member being able to switch between a restricting state and an allowing state, the restricting state being a state in which the electric plug is restricted from being attached and detached to and from the external connecting portion, and the allowing state being a state in which the electric plug can be attached and detached to and from the external connecting portion,
the vehicle comprising:
a vehicle-side connecting portion to which the external power supply connector is connected;
a battery; and an electronic control unit configured to control power supplied from the battery to the vehicle-side connecting portion, the electronic control unit being configured not to supply power to the external power supply connector when in the restricting state.

8. The vehicle according to claim 7, wherein the electronic control unit supplies power to the external power supply connector when the restricting member is changed from the allowing state to the restricting state, while the external power supply connector is connected to the vehicle-side connecting portion.

9. The vehicle according to claim 7, the external power supply connector being operated by a user, wherein
the external power supply connector includes:
a device-side connecting portion provided on the device main body, the device-side connecting portion fitting together with the vehicle-side connecting portion,
a device-side engaging portion configured to engage with a vehicle-side engaging portion provided on the vehicle, and
a switching portion operated by the user, the switching portion being configured to switch between an engaged state and a released state, the engaged state being a state in which the device-side engaging portion engages with the vehicle-side engaging portion, and the released state being a state in which the engaged state is released,
the external power supply connector is connected to the vehicle-side connecting portion by fitting the device-side connecting portion together with the vehicle-side connecting portion, and engaging the device-side engaging portion with the vehicle-side engaging portion, and
wherein the electronic control unit is configured not to supply power to the external power supply connector when the switching portion is operated so as to be placed in the released state, while the device-side connecting portion is connected to the vehicle-side connecting portion.

10. The vehicle according to claim 7, the external power supply connector being operated by a user, wherein
the external power supply connector further includes an operating portion that is operated by the user; and
the electronic control unit is configured to supply power to the external power supply connector when the operating portion is operated when the external power supply connector is connected to the vehicle-side connecting portion, and the restricting member is in the restricting state.

11. An external power supply system comprising:
a vehicle including an electronic control unit and a vehicle-side connecting portion; and
an external power supply connector connected to the vehicle-side connecting portion, the external power supply connector being configured to extract power from the vehicle, the external power supply including:
a device main body including an external connecting portion, the external connecting portion being connected to an electric plug, and the electric plug being connected to an external device; and
a restricting member provided on the device main body, the restricting member being able to switch between a restricting state and an allowing state, the restricting state being a state in which the electric plug is restricted from being attached and detached to and from the external connecting portion, and the allowing state being a state in which the electric plug can be attached and detached to and from the external connecting portion,
wherein the electronic control unit is configured not to supply power to the external power supply connector when the restricting member is in the allowing state.

\* \* \* \* \*